United States Patent
Nakamura

(10) Patent No.: US 7,855,818 B2
(45) Date of Patent: Dec. 21, 2010

(54) OPTICAL SCANNING APPARATUS AND IMAGE FORMING APPARATUS

(75) Inventor: Tadashi Nakamura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 300 days.

(21) Appl. No.: 12/023,414

(22) Filed: Jan. 31, 2008

(65) Prior Publication Data

US 2008/0218829 A1 Sep. 11, 2008

(30) Foreign Application Priority Data

Mar. 7, 2007 (JP) ............................. 2007-057659

(51) Int. Cl.
*G02B 26/10* (2006.01)

(52) U.S. Cl. .............. 359/212.1; 359/213.1; 359/223.1; 359/226.1

(58) Field of Classification Search ............. 359/212.1, 359/212.2, 213.1, 212, 223, 226; 399/151
See application file for complete search history.

(56) References Cited

U.S. PATENT DOCUMENTS

| | | | |
|---|---|---|---|
| 6,757,089 B2 | 6/2004 | Hayashi | |
| 7,177,060 B2 * | 2/2007 | Nomura et al. | 359/212.1 |
| 7,184,187 B2 * | 2/2007 | Cannon et al. | 359/205.1 |
| 7,190,499 B2 * | 3/2007 | Deng et al. | 359/206.1 |
| 7,206,109 B2 * | 4/2007 | Hayakawa et al. | 359/213.1 |
| 7,271,938 B2 * | 9/2007 | Kawamura et al. | 358/509 |
| 7,436,564 B2 * | 10/2008 | Gomi et al. | 359/213.1 |
| 7,483,194 B2 * | 1/2009 | Hayakawa et al. | 359/213.1 |
| 7,557,976 B2 * | 7/2009 | Gomi et al. | 359/213.1 |
| 7,646,523 B2 * | 1/2010 | Ishibe | 359/215.1 |
| 2005/0231781 A1 * | 10/2005 | Nomura et al. | 359/224 |
| 2007/0297036 A1 | 12/2007 | Nakamura et al. | |
| 2008/0291516 A1 * | 11/2008 | Gomi et al. | 359/213 |
| 2009/0021817 A1 * | 1/2009 | Gomi et al. | 359/213 |

FOREIGN PATENT DOCUMENTS

| | | |
|---|---|---|
| JP | 11-64759 | 3/1999 |
| JP | 2924200 | 5/1999 |
| JP | 3011144 | 12/1999 |
| JP | 2002-82303 | 3/2002 |

OTHER PUBLICATIONS

U.S. Appl. No. 12/204,483, filed Sep. 4, 2008, Nakamura.

* cited by examiner

*Primary Examiner*—Frank G Font
(74) *Attorney, Agent, or Firm*—Oblon, Spivak, McClelland, Maier & Neustadt, L.L.P.

(57) ABSTRACT

In an optical scanning apparatus, an aperture is provided between a semiconductor laser in a light source unit and an oscillating mirror, and between a cylindrical lens and the oscillating mirror. When a light beam from the semiconductor laser comes into an reflection surface of the oscillating mirror, the optical scanning apparatus is configured to limit a beam width of the light beam to a width appropriate to the reflection surface, and then to ensure an irradiation position of the light beam in a main-scanning direction to come into the reflection surface of the oscillating mirror, by causing the light beam to pass through an opening of the aperture.

20 Claims, 15 Drawing Sheets

FIG. 14A
FIG. 14B
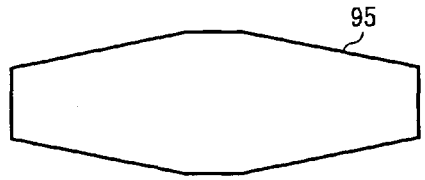
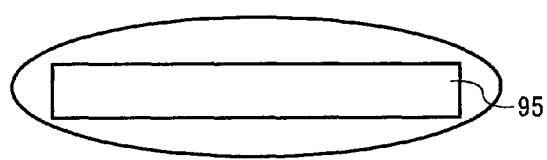
FIG. 15A
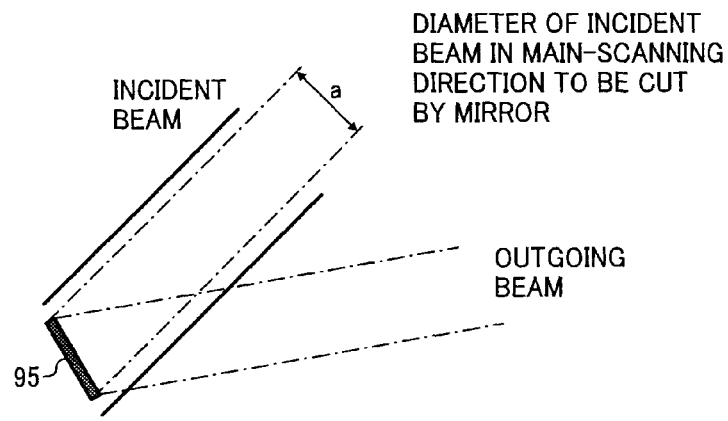
FIG. 15B
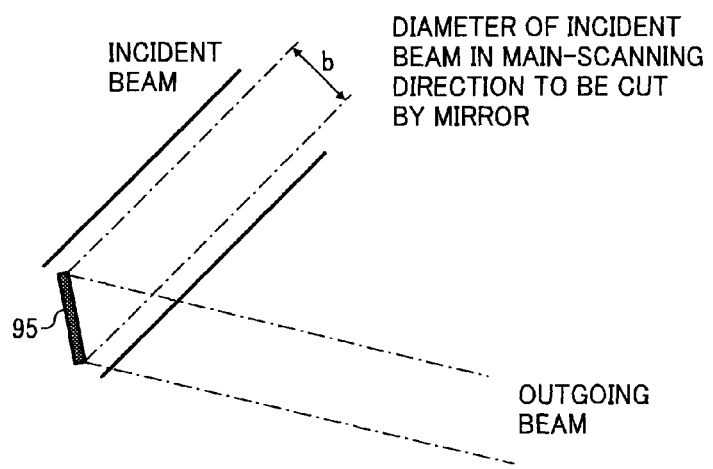

OPTICAL SCANNING APPARATUS AND IMAGE FORMING APPARATUS

CROSS-REFERENCE TO RELATED APPLICATIONS

The present application claims priority to and incorporates by reference the entire contents of Japanese priority document 2007-057659 filed in Japan on Mar. 7, 2007.

BACKGROUND OF THE INVENTION

1. Field of the Invention

The present invention relates to an optical scanning apparatus for use in an image forming apparatus.

2. Description of the Related Art

To scan with a light beam onto a photosensitive element, various optical scanning apparatuses are used in image forming apparatuses, such as, a digital photocopier, a facsimile, and a laser printer. According to an optical scanning apparatus that has been conventionally used, a polygon mirror or a galvanometer mirror has been used as a deflector that deflects a light beam from a light source.

However, to form an image in a higher resolution for a shorter time, an optical scanning apparatus needs to rotate a polygon mirror or galvanometer mirror at a higher speed. There is a limitation to rotating the polygon mirror or the galvanometer mirror at a higher speed due to obstacles, such as noise, heat during rotation, and endurance of the bearing that rotatably supports the polygon mirror or the galvanometer mirror.

For this reason, as a deflector used in the optical scanning apparatus, a deflector produced by silicon micro machining is recently proposed (for example, see Japanese Patent Publication No. 2924200, Japanese Patent Publication No. 3011144, and Japanese Patent Application Laid-open No. 2002-82303).

As shown in FIG. 20, a deflector 501 of this type has an integrally molded structure formed of an oscillating mirror 502 and twist beams 503. The surface of the oscillating mirror 502 forms a reflection surface 502a, and the twist beams 503 support the oscillating mirror 502 as a pivot. The deflector 501 has advantages that a small size can be achieved by making the oscillating mirror 502 small in size, and that the deflector 501 works with a low noise and at a low power consumption in spite of that high speed operation is available, because the oscillating mirror 502 is reciprocated and oscillated by using resonance of the oscillating mirror 502.

Furthermore, the deflector 501 has another advantage, which is that, because the deflector 501 causes low oscillation and almost no heat, a housing to accommodate the optical scanning apparatus can be made of thin walls. Thus, the housing is constructed with a resin molding material, at low cost, that contains glass fiber at a low mix proportion, and the image quality is hardly influenced.

Particularly, Japanese Patent Application Laid-Open No. 2002-82303 discloses an example that the deflector 501 is used instead of a polygon mirror. The example proposed is an image forming apparatus that is suitable for an office environment and appropriate to the global environment because low noise and low power consumption are achieved by using an oscillating mirror as a substitute for a polygon mirror.

However, when the oscillating mirror 502 is driven, dynamic surface deformation, due to a moment of inertia and a restoring force of the oscillating mirror 502, occurs as described below.

Suppose dimensions of the oscillating mirror 502 shown in FIG. 20 are $2a$ in the longitudinal direction, $2b$ in the transverse direction, and d in thickness; and the density of silicon is $\rho$. The moment of inertia I of the oscillating mirror 502 is expressed in the following equation 1.

$$\text{Moment of inertia } I = (4ab\rho d/3) \times a^2 \qquad (1)$$

As shown in equation 1, the moment of inertia I of the oscillating mirror 502, which is a local moment, is a function of a distance from the rotation axis to the edge of the oscillating mirror 502, such that, the larger the distance is to the edge of the oscillating mirror 502 from the rotation axis, the larger the moment of inertia will be.

The thickness of the oscillating mirror 502 is a few hundred micrometers, which is thin. Thus, when there is a change in the rotation speed, due to reciprocating oscillation and the moment of inertia applied on the oscillating mirror 502, a force is exerted in opposite directions at both a point in the vicinity of the twist beam 503 of the oscillating mirror 502 and an end away from the twist beam 503. Consequently, the oscillation mirror 502 is waved and deformed as shown in FIG. 21.

Accordingly, a wavefront aberration of the light flux of the light beam reflected by the oscillating mirror 502 becomes large, so that the light beam widens problematically.

FIG. 21 depicts a state of deformation of the oscillating mirror 502 formed as a simple plate. Along with degradation of the wavefront aberration of the light flux, as indicated by dashed lines shown in FIG. 21, deviations of incidence positions are produced in the direction orthogonal to the twist beams 503 (main-scanning direction).

In such a case, apparent curvatures are different, so that imaging positions of the light beam are deviated (out of focus). Particularly due to an assembling deviation of the deflector or the light source, when the light beam is irradiated to an edge of the oscillating mirror 502 as shown in FIGS. 22A and 22B, the light beam at an imaging position 505 becomes out of focus.

Consequently, the light beam irradiated to the edge of the oscillating mirror 502 becomes a converging light flux in the main-scanning direction (see FIG. 22A), or a diverging light flux (see FIG. 22B). As a result, the light beam cannot be uniformly converged onto the imaging position 505, and a desired beam-spot diameter cannot be obtained.

For this reason, conventionally the light beam cannot be converged across an entire scanned surface, and the beam-spot diameter cannot be kept constant, resulting in a problem of degradation of the image.

SUMMARY OF THE INVENTION

It is an object of the present invention to at least partially solve the problems in the conventional technology.

According to an aspect of the present invention, there is provided an optical scanning apparatus including a light source unit that emits a light beam; a light-source activating unit that activates the light source unit; an aperture unit having an opening for limiting a beam width of the light beam output from the light source unit; a light deflection unit that includes a reflection surface configured to deflect the light beam output from the light source unit, the reflection surface being configured to rotate freely about a twist beam; and an optical system that forms an image into a spot onto a scan target surface with the light beam deflected by the light deflection unit. The aperture unit is arranged such that a center of the light beam incident to the light deflection unit substantially matches a rotation axis of the reflection surface.

According to another aspect of the present invention, there is provided an optical scanning apparatus including a light source unit that emits a light beam; a light deflection unit that includes a reflection surface configured to deflect the light beam output from the light source unit, the reflection surface being configured to rotate freely about a twist beam; and an optical system that forms an image into a spot onto a scan target surface with the light beam deflected by the light deflection unit. A beam width of the light beam is limited by the reflection surface at least in a main-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 14A and 14B depict shapes of reflection surfaces according to the second embodiment;

FIGS. 15A and 15B are schematic diagrams for explaining diameters of incident beams according to the second embodiment;

DETAILED DESCRIPTION OF THE PREFERRED EMBODIMENTS

Exemplary embodiments of the present invention will be explained below in detail with reference to the accompanying drawings. First of all, a first embodiment of the present invention is explained below with reference to FIGS. 1 to 12.

Figure 1:
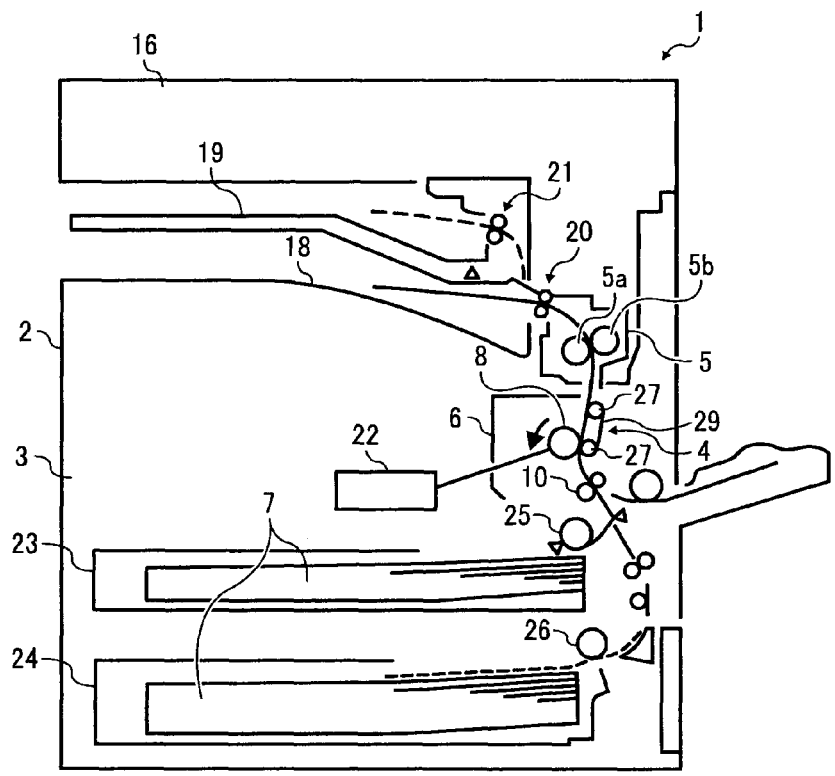
FIG. 1 is a schematic diagram of an inside front of an image forming apparatus according to a first embodiment of the present invention.

An image forming apparatus 1 forms an image on a paper 7 as a transfer material shown in FIG. 1. As shown in FIG. 1, the image forming apparatus 1 includes at least an apparatus body 2, a paper feeding unit 3, a registering roller pair 10, a transferring unit 4, a fixing unit 5, a laser writing unit 22 as an optical scanning apparatus, a process cartridge 6, and a delivery unit 16.

The apparatus body 2 can be formed, for example, in a box shape, and placed on a floor. The apparatus body 2 accommodates the paper feeding unit 3, the registering roller pair 10, the transferring unit 4, the fixing unit 5, the laser writing unit 22, and the process cartridge 6.

The paper feeding unit 3 is placed below the apparatus body 2, and includes a plurality of paper feeding cassettes 23 and 24 that can be inserted into and removed from the apparatus body 2 as required. The paper feeding cassettes 23 and 24 accommodate the paper 7 in a superposed manner, and the paper feeding cassettes 23 and 24 are provided with paper feeding rollers 25 and 26, respectively. Each of the paper feeding rollers 25 and 26 is pressed against a top sheet of the paper 7 in each of the paper feeding cassettes 23 and 24. The paper feeding rollers 25 and 26 send out the top sheet of the paper 7 towards (a nip) between the registering roller pair 10.

The registering roller pair 10 includes a pair of rollers, and is arranged on a delivery route of the paper 7 to be delivered to the transferring unit 4 from the paper feeding unit 3. The registering roller pair 10 holds the paper 7 between the pair of the rollers, and sends out the paper 7 into between the transferring unit 4 and the process cartridge 6 in accordance with the timing of superposing toner images (the timing of the start of recording in a sub-scanning direction (vertical direction in FIG. 1)).

The transferring unit 4 is arranged above the paper feeding unit 3. The transferring unit 4 includes a plurality of rollers 27 and a transferring belt 29. Each of the rollers 27 is rotatably placed in the apparatus body 2, and at least one of the rollers 27 is driven and rotated, for example, by a motor as a driver.

The transferring belt 29 is formed into an endless loop, and threaded around the rollers 27. Being threaded around the rollers 27, the transferring belt 29 is positioned below, and in the vicinity of, the process cartridge 6. As at least one of the rollers 27 is driven and rotated by a motor, the transferring belt 29 is revolved (endlessly runs) around the rollers 27.

As the transferring belt 29 presses the paper 7 sent out from the paper feeding unit 3 onto the outer surface of a photosensitive drum 8 of the process cartridge 6, the transferring unit 4 transfers a toner image on the photosensitive drum 8 to the paper 7. The transferring unit 4 sends out the paper 7, on which the toner image is transferred, towards the fixing unit 5.

The fixing unit 5 includes a pair of rollers 5a and 5b, which hold therebetween the paper 7. The fixing unit 5 fixes the toner image on the paper 7 transferred from the photosensitive drum 8 by pressing and heating in between the pair of the rollers 5a and 5b the paper 7 sent out from the transferring unit 4.

The laser writing unit 22 is arranged in the upper part of the apparatus body 2, i.e., above the paper feeding unit 3. The laser writing unit 22 forms an electrostatic latent image by irradiating a laser light onto the outer surface of the photosensitive drum 8 uniformly charged by an electrostatic charger 9 of the process cartridge 6. The laser writing unit 22 performs image recording (forms an electrostatic latent image) of two lines each on the outer surface of the photosensitive drum 8 by performing a cycle of reciprocation scanning with an oscillating mirror 85. A detailed configuration of the laser writing unit 22 is explained hereafter.

Figure 2:
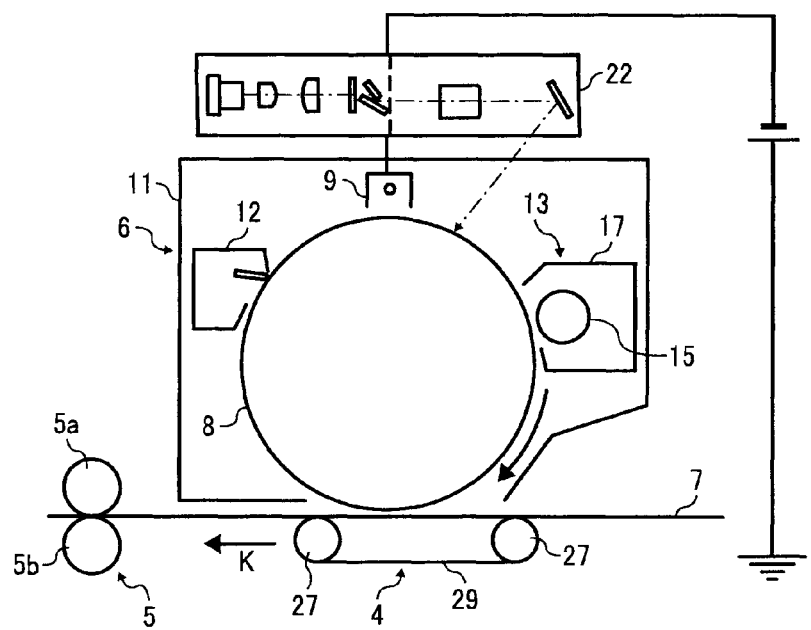
FIG. 2 is a schematic diagram for explaining relevant parts in an image forming apparatus shown in FIG. 1, such as a laser writing unit as an optical scanning apparatus and a photosensitive element.

The process cartridge 6 is arranged between the transferring unit 4 and the laser writing unit 22, and is detachable from the apparatus body 2. As shown in FIG. 2, the process cartridge 6 includes a cartridge case 11, the electrostatic charger 9 as a charging device, the photosensitive drum 8 as an image carrier, a cleaning case 12 as a cleaning device, and a development device 13. Consequently, the image forming apparatus 1 includes at least the electrostatic charger 9, the photosensitive drum 8, the cleaning case 12, and the development device 13.

The cartridge case 11 is detachable from the apparatus body 2, and accommodates the electrostatic charger 9, the photosensitive drum 8, the cleaning case 12, and the development device 13. The electrostatic charger 9 charges uniformly over the outer surface of the photosensitive drum 8. The photosensitive drum 8 is arranged apart from a development roller 15 of the development device 13 keeping a space. The photosensitive drum 8 is formed into a column or a cylindrical shape rotatably around the axis of the drum.

The photosensitive drum 8 is configured to have an electrostatic latent image formed thereon by the laser writing unit 22. The photosensitive drum 8 develops thereon a toner image as toner is absorbed onto the electrostatic latent image formed and carried on the outer surface of the photosensitive drum 8, and transfers the toner image obtained in this way to the paper 7 positioned between the transferring belt 29 and the photosensitive drum 8. The outer surface of the photosensitive drum 8 is configured as a surface to be scanned. The cleaning case 12 removes transfer residual toner remaining on the outer surface of the photosensitive drum 8 after a toner image is transferred to the paper 7.

The development device 13 includes at least a toner cartridge 17, and the development roller 15 as a developer carrier. The development device 13 stirs toner in the toner cartridge 17 sufficiently, and absorbs the stirred toner onto the outer surface of the development roller 15. The development device 13 then makes the photosensitive drum 8 absorb the toner by rotating the development roller 15. In this way, the development device 13 conveys the toner to a development zone by carrying the toner with the development roller 15, develops an electrostatic latent image on the photosensitive drum 8, and then forms a toner image.

The development roller 15 is arranged in parallel with and in the vicinity of the photosensitive drum 8. The space between the development roller 15 and the photosensitive drum 8 forms the development zone for the photosensitive drum 8 to absorb toner and to obtain a toner image by developing an electrostatic latent image.

The delivery unit 16 includes delivery trays 18 and 19 arranged on the upper surface of the apparatus body 2, and pairs of delivery rollers 20 and 21, which are arranged for the delivery trays 18 and 19, respectively. Each of the pairs of the delivery rollers 20 and 21 is supplied therebetween with the paper 7, on which a toner image is fixed, by being held between the pair of the rollers 5a and 5b of the fixing unit 5. The pairs of the delivery rollers 20 and 21 deliver the paper 7, on which the toner image is fixed, onto the delivery trays 18 and 19, respectively.

The image forming apparatus 1 forms an image on the paper 7 as described below.

To begin with, the image forming apparatus 1 uniformly charges the outer surface of the photosensitive drum 8 with the electrostatic charger 9 by rotating the photosensitive drum 8. By irradiating a laser light to the outer surface of the photosensitive drum 8, an electrostatic latent image is formed on the outer surface of the photosensitive drum 8.

When the electrostatic latent image is positioned in the development zone, the toner absorbed on the outer surface of the development roller 15 of the development device 13 is absorbed onto the outer surface of the photosensitive drum 8, the electrostatic latent image is developed, and then a toner image is formed on the outer surface of the photosensitive drum 8.

The image forming apparatus 1 positions the paper 7 conveyed by the paper feeding rollers 25 and 26 of the paper feeding unit 3 into between the photosensitive drum 8 of the process cartridge 6 and the transferring belt 29 of the transferring unit 4, and transfers the toner image formed on the outer surface of the photosensitive drum 8 to the paper 7.

The image forming apparatus 1 fixes the toner image onto the paper 7 with the fixing unit 5, and delivers the paper 7 to one of the delivery trays 18 and 19 of the delivery unit 16. Thus, the image forming apparatus 1 forms an image on the paper 7.

Details of the laser writing unit 22 are explained below. The laser writing unit 22, which scans the photosensitive drum 8, having an integrated configuration as shown in FIG. 2, simultaneously forms an electrostatic latent image onto the photosensitive drum 8 in accordance with a moving direction K of the paper 7 (indicated by an arrow shown in FIG. 2), by deflecting and guiding a light beam from a semiconductor laser 51 with the oscillating mirror 85. Hereinafter, a direction in parallel with the axis of the photosensitive drum 8 is denoted by an arrow X in the drawings, and referred to as a main-scanning direction, a direction in parallel with the light axis of a light beam deflected by the oscillating mirror 85 is denoted by an arrow Y and referred to as a light-axis direction, and a direction orthogonal to both of the main-scanning direction X and the light-axis direction Y is denoted by an arrow Z and referred to as a sub-scanning direction.

Figure 3:
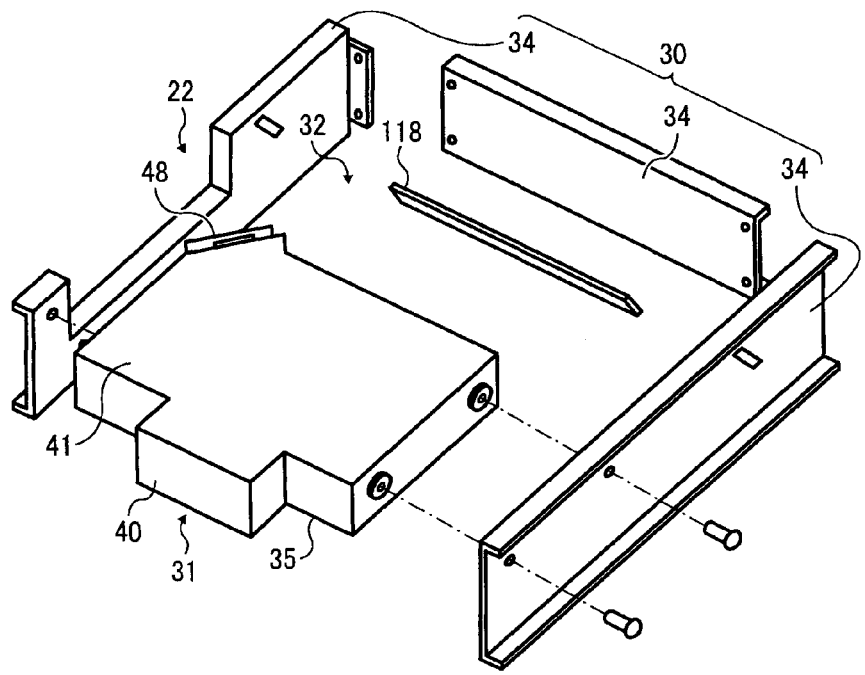
FIG. 3 is an exploded perspective view of the laser writing unit in the image forming apparatus shown in FIG. 1.
Figure 4:
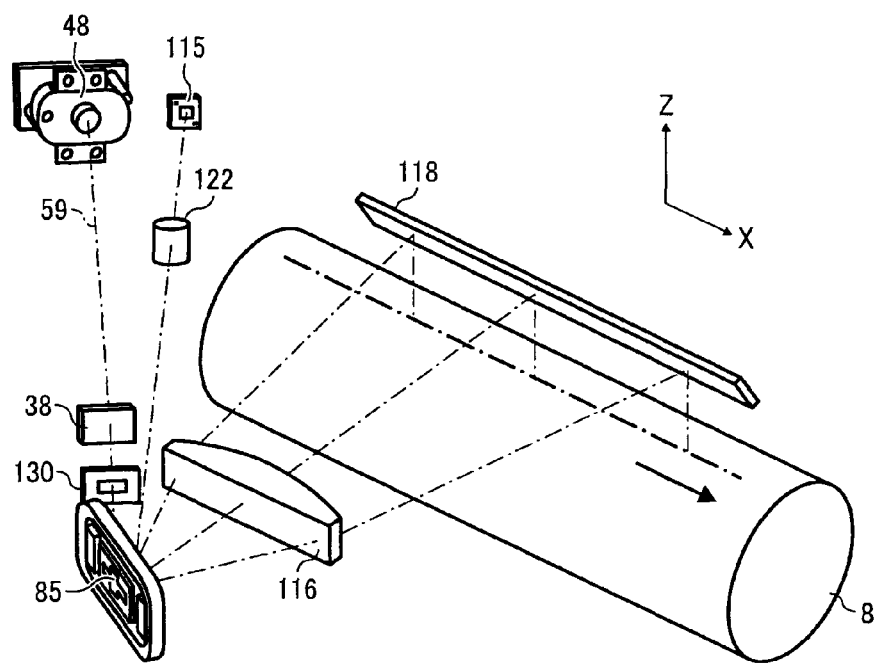
FIG. 4 is a schematic diagram for explaining relevant parts in the image forming apparatus shown in FIG. 1, such as the laser writing unit and the photosensitive element.

As shown in FIGS. 3 and 4, the laser writing unit 22 includes a unit body 30, a light source device 31, and an imaging optical system 32. As shown in FIG. 3, the unit body 30 includes three of plate members 34, which are formed as band plates. The plate members 34 are attached to the apparatus body 2 to form a square U-shape in a plan view by fastening edges of the plate members 34 to each other.

Figure 5:
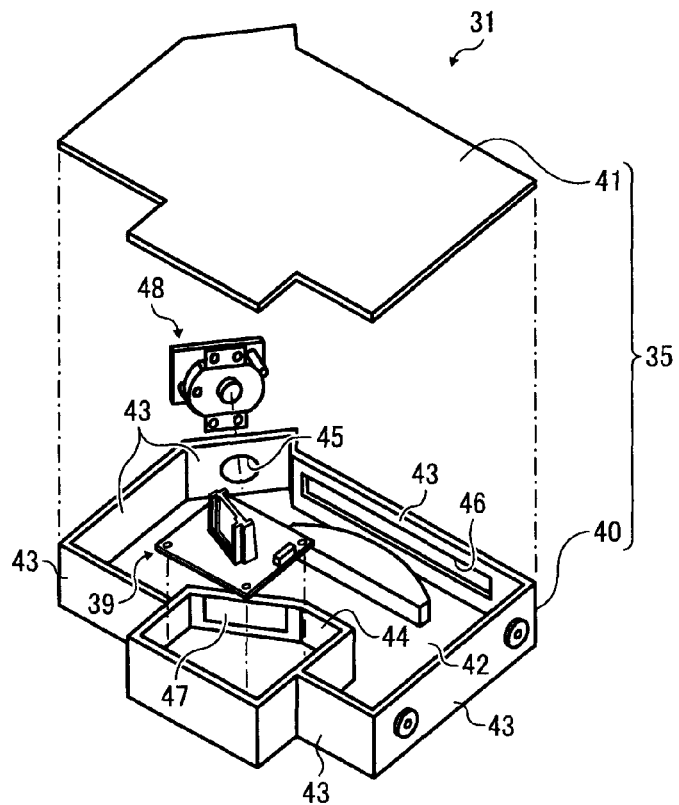
FIG. 5 is an exploded perspective view of a light source device in the laser writing unit shown in FIG. 3.

As shown in FIGS. 3, 4, and 5, the light source device 31 includes an optical housing 35, a light source unit 48, a cylindrical lens 38 as a linear-image forming lens, a deflection unit 39, and an aperture 130 that sets the aperture.

The optical housing 35 includes a housing case 40 and an upper cover 41 of a flat plate, both of which are made from a synthetic resin. The housing case 40 includes a bottom plate 42 of a flat plate, a plurality of side plates 43 that is arranged to stand from the outer edges of the bottom plate 42, and a partition plate 44 in an integrated manner. Two of the side plates 43, which are continuous with each other, are provided with a fitting hole 45 configured to mount the light source unit 48, and an emission window 46. The fitting hole 45 is formed into a circle. The emission window 46 is formed into a flat rectangle.

The partition plate 44 partitions the inside of the housing case 40, i.e., a space inside the optical housing 35, into a space for accommodating the deflection unit 39, and a space for accommodating items other than the deflection unit 39.

The partition plate 44 is provided with a rectangular window of a transparent member 47. The upper cover 41 is attached to the housing case 40 to close an upper opening formed at edges of the side plates 43 of the housing case 40 on the side apart from the bottom plate 42, and seals the optical housing 35.

Figure 9A:
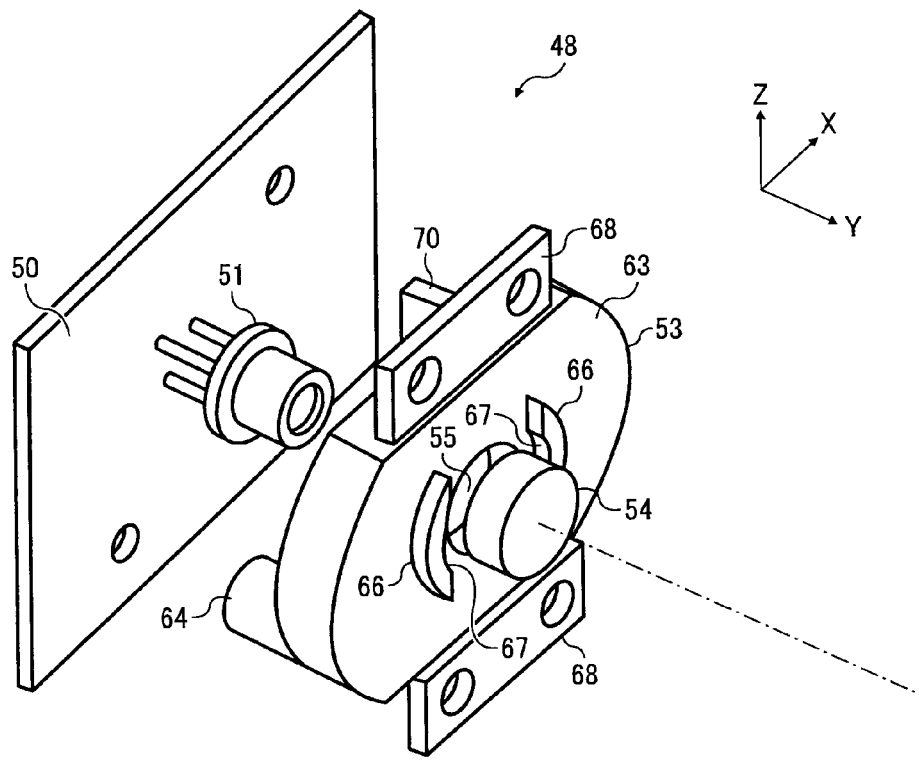
FIG. 9A is an exploded perspective view of a light source unit in the light source device shown in FIG. 5.
Figure 9B:
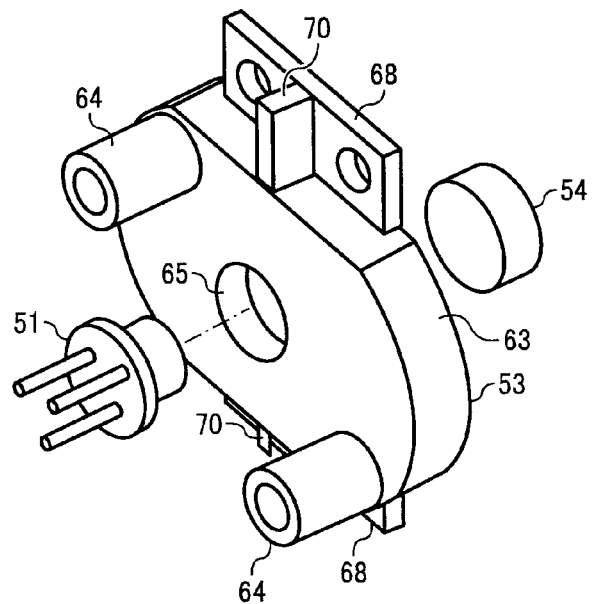
FIG. 9B is an exploded perspective view from the back side of the light source unit shown in FIG. 9A.

As shown in FIGS. 9A and 9B, the light source unit 48 includes a printing substrate 50, the semiconductor laser 51 as a light source unit, a holder member 53, a coupling lens 54, and a light-source activating unit, not shown, which activates the semiconductor laser 51. The printing substrate 50 includes, for example, an insulative substrate, and a wiring pattern formed on the outer surface of the substrate.

The semiconductor laser 51 is mounted on the printing substrate 50. Precisely, the light source unit 48 includes the semiconductor laser 51 as a light source of the process cartridge 6. The semiconductor laser 51 emits a light beam 59 to the photosensitive drum 8.

The holder member 53 includes a holder body 63 of a thick flat plate, a pair of supports 64, a laser positioning hole 65, a pair of projections 66, and a pair of attachment planes 68. The holder body 63 is provided with spindles 70 projecting and extending along the sub-scanning direction Z outwardly from both ends of the holder body 63 in the sub-scanning direction Z.

The pair of the supports 64 is arranged at positions on edges of the holder body 63 opposing each other with respect to the center of the holder body 63, and stands from the holder body 63 towards the printing substrate 50. As the supports 64 are placed to fit to the printing substrate 50, and screws coming through the printing substrate 50 are screwed into the supports 64, the supports 64 secure the holder member 53 to the printing substrate 50.

The laser positioning hole 65 runs through the holder body 63, and is arranged in the center of the holder body 63. As the semiconductor laser 51 enters inside the laser positioning hole 65, the laser positioning hole 65 positions the semiconductor laser 51.

Each of the attachment planes 68 is formed into a flat plate and continued to each of the spindles 70. The surfaces of the attachment planes 68 are substantially flush with the outer surface of the holder body 63.

The pair of the projections 66 is formed from the holder body 63 to be convex and project in a direction away from the printing substrate 50, i.e., towards the deflection unit 39. The pair of the projections 66 is arranged such that the laser positioning hole 65 is positioned in between the projections 66. Outer edges of the projections 66 are formed to fit along the inner edge of the fitting hole 45. The pair of the projections 66 fits inside the fitting hole 45, and positions the light source unit 48 to the optical housing 35. A groove 67 is formed on each of the inner surfaces of the projections 66, and the groove 67 is formed into a U-shape in cross section, and to be flush with the inner surface of the laser positioning hole 65.

The position of the coupling lens 54 in the light-axis direction Y of the semiconductor laser 51 is adjusted to match the light axis of the coupling lens 54 with the light axis of the semiconductor laser 51 and to emit the light beam 59 as a parallel ray, and then an ultraviolet-curing adhesive is filled in between the coupling lens 54 and respective inner surfaces of the grooves 67 of the pair of the projections 66, so that the coupling lens 54 is secured to the projections 66, i.e., the holder body 63.

As the projections 66 are inserted into the fitting hole 45 of the optical housing 35, a rotating direction of the light source unit 48 is positioned, and then the light source unit 48 is secured by press fitting. Screws coming through the side plates 43 of the optical housing 35 are screwed into the attachment planes 68, so that the light source unit 48 is secured to the optical housing 35.

The cylindrical lens 38 is accommodated inside the optical housing 35. The cylindrical lens 38 is provided so as to deflect the light beam 59 in the sub-scanning direction Z as required. The cylindrical lens 38 receives an incidence of the light beam 59 emitted from the light source unit 48, and emits the light beam 59 to a reflection surface 95 of the oscillating mirror 85 of the deflection unit 39. The cylindrical lens 38 converges the light beam 59 in the sub-scanning direction Z on the reflection surface 95 of the oscillating mirror 85.

Figure 6:
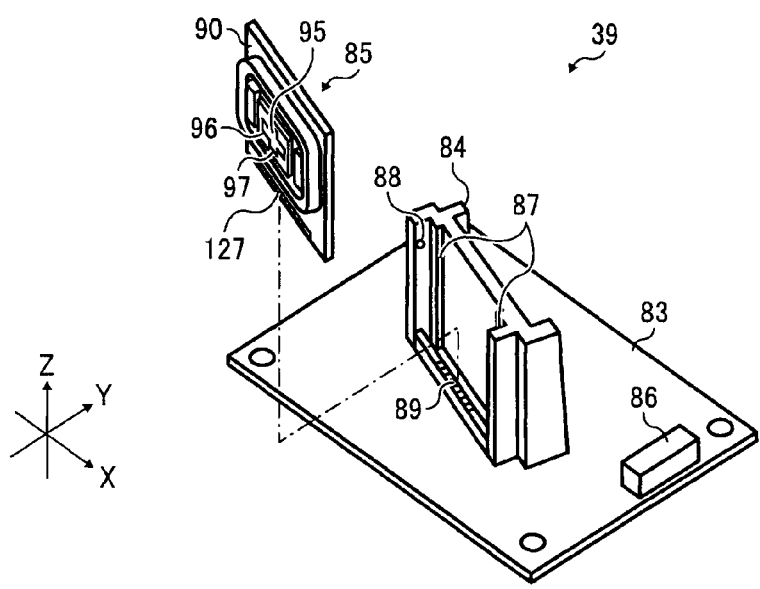
FIG. 6 is an exploded perspective view of a deflection unit in the light source device shown in FIG. 5.

As shown in FIG. 6, the deflection unit 39 includes a circuit substrate 83, a supporting member 84, the oscillating mirror 85, and a drive circuit (not shown) mounted on the circuit substrate 83. An example of an electromagnetic drive system is explained below as a method of generating torque of the oscillating mirror 85 in the first embodiment.

The circuit substrate 83 includes an insulative substrate and a wiring pattern formed on the surface of the substrate. A control integrated circuit and a crystal oscillator that constitute the drive circuit of the oscillating mirror 85, a connector 86, and the like, are mounted on the circuit substrate 83, and power from the power source and a control signal are input and output via the connector 86.

The supporting member 84 is molded from a synthetic resin. The supporting member 84 is positioned at a predetermined position on the circuit substrate 83, and stands from the circuit substrate 83. The supporting member 84 is equipped with the oscillating mirror 85. The supporting member 84 includes a positioning unit 87, a holding hook 88, and an edge connecter unit 89 in an integrated manner. The positioning unit 87 positions the oscillating mirror 85 such that a twist beams 97 are to be orthogonal to the main-scanning direction X, and the reflection surface 95 is to be inclined at a predetermined angle with respect to the main-scanning direction X, for example, 22.5 degrees according to the first embodiment. The holding hook 88 locks an outer edge of a mounting substrate 90 of the oscillating mirror 85. The edge connecter unit 89 includes metal terminals that are arranged to come into contact with wiring terminals 127 when the oscillating mirror 85 is mounted, the wiring terminals 127 being formed on a side of the mounting substrate 90 of the oscillating mirror 85.

Figure 7A:
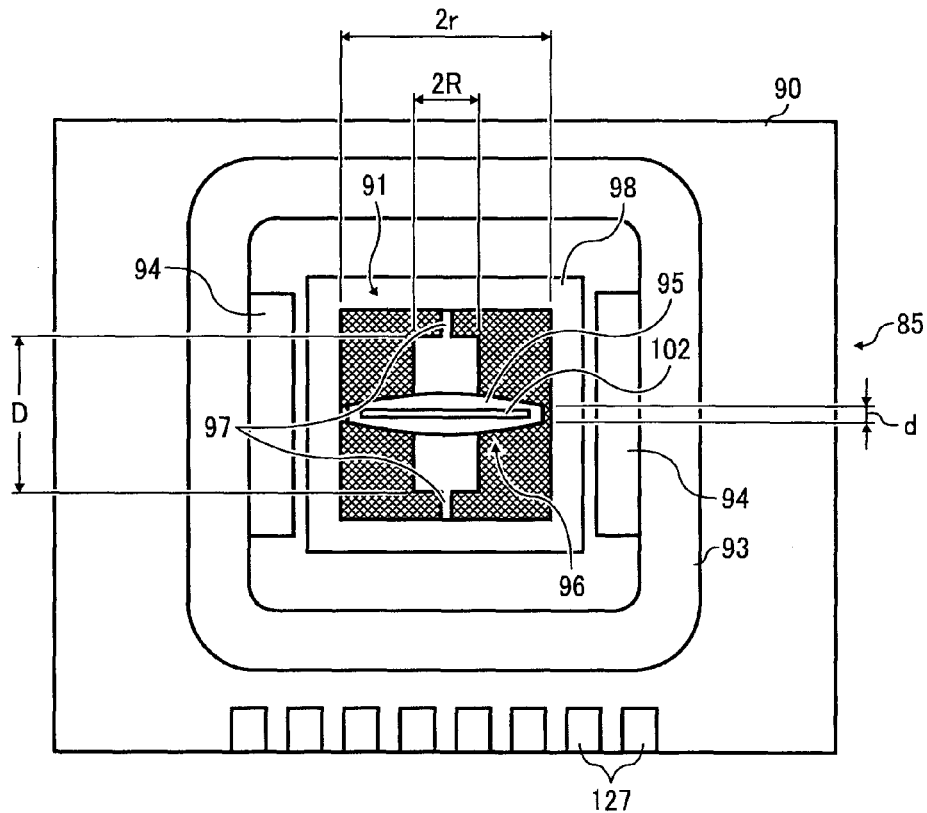
FIG. 7A is a front view of an oscillating mirror in the deflection unit shown in FIG. 6.
Figure 7B:
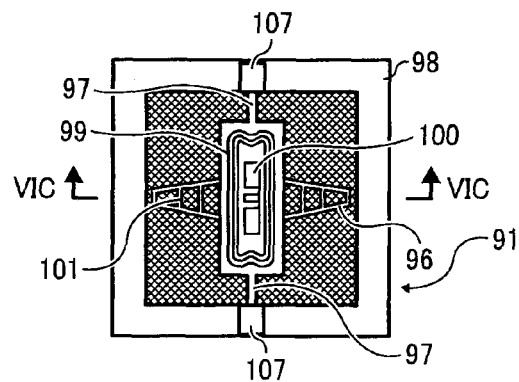
FIG. 7B is a back view of a mirror unit of the oscillating mirror shown in FIG. 6.
Figure 7C:
FIG. 7C is a cross sectional view of the mirror unit shown in FIG. 7B along a line between VIC and VIC.
Figure 8:
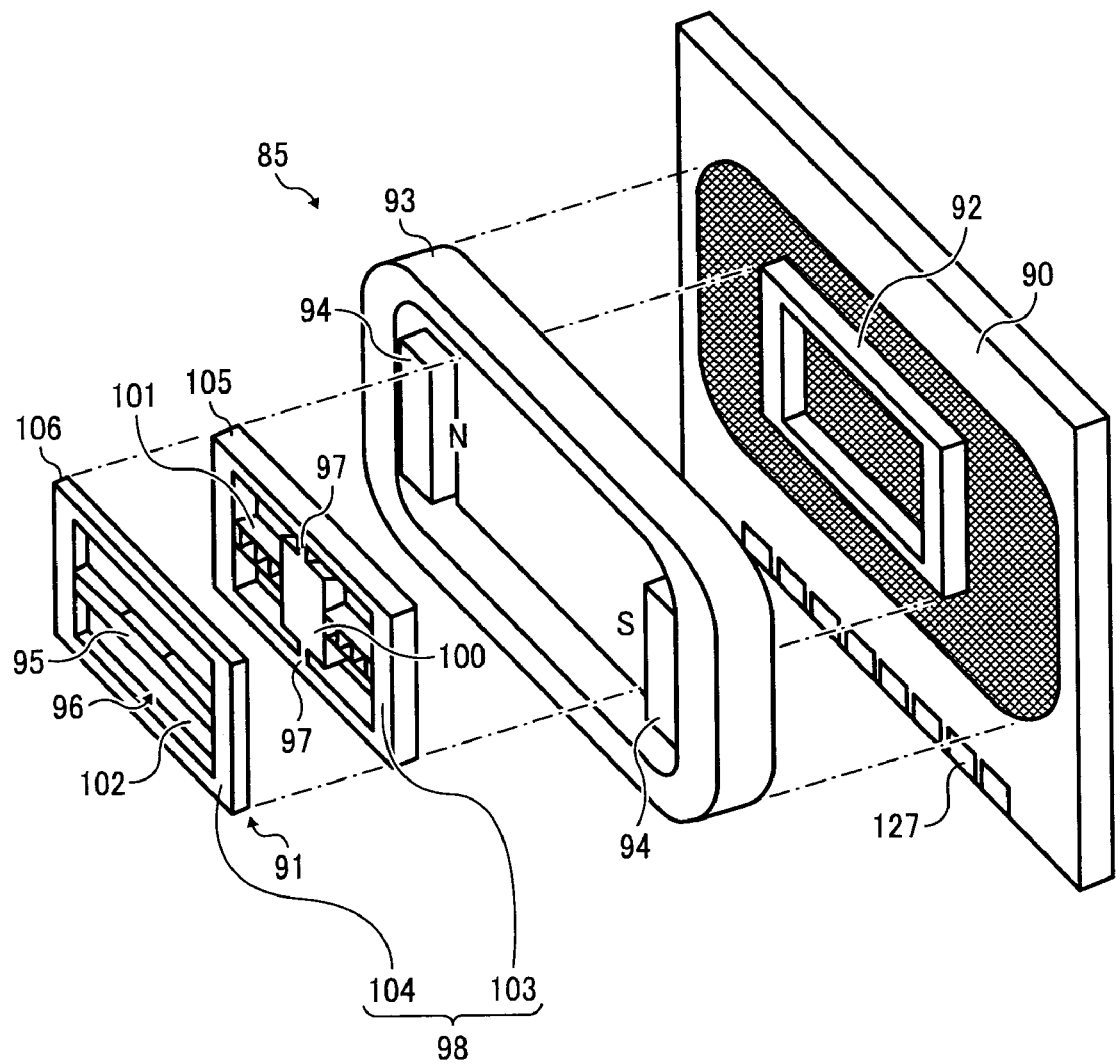
FIG. 8 is an exploded perspective view of the oscillating mirror shown in FIG. 7A.

As shown in FIG. 7A, the oscillating mirror 85 is obtained as follows: the reflection surface 95 is supported by the twist beams 97 as a pivot; the contour is produced from a silicon substrate by etching, which will be described later; and the etched silicon substrate is attached onto the mounting substrate 90. A module of a pair of silicon substrates bonded back to back into one piece is shown in the first embodiment.

Thus, the oscillating mirror 85 is obtained. A side of the mounting substrate 90 is then inserted into the edge connecter unit 89, the outer edge of the mounting substrate 90 is locked by the holding hook 88, both side surfaces of the mounting substrate 90 are placed along the positioning unit 87, and then the oscillating mirror 85 is supported by the supporting member 84. In this way, electrical wiring can be simultaneously finished and the oscillating mirror 85 can be individually replaced.

As shown in FIGS. 7A, 7B, 7C, and 8, the oscillating mirror 85 includes the mounting substrate 90 and a mirror unit 91. The mounting substrate 90 is provided thereon with a mount 92 and a yoke 93. The mount 92 is a frame for mounting the mirror unit 91, and the yoke 93 is formed to surround the mirror unit 91. The yoke 93 is attached with a pair of permanent magnets 94. The south pole and the north pole of each of the pair of the permanent magnets 94 oppose each other along a direction orthogonal to the longitudinal direction of the twist beams 97. The pair of the permanent magnets 94 generates a magnetic field in the direction orthogonal to the longitudinal direction of the twist beams 97.

The mirror unit 91 includes a moving part 96, the twist beams 97, and a frame 98. The moving part 96 includes the reflection surface 95 formed on its surface and functions as an oscillator. One end of each of the twist beams 97 is continued to each of both ends of the sub-scanning direction Z of the moving part 96, and the twist beams 97 are placed to stand from both ends along the sub-scanning direction Z to form a pivot. The frame 98 forms a support unit of which part of inner edges is connected to the other end of each of the twist beams 97. The mirror unit 91 is formed from at least one silicon substrate, which is cut out by etching. According to the first embodiment, the mirror unit 91 is obtained by using a wafer called as silicon-on-insulator substrate, which is made of two substrates 105 and 106, bonded in advance, having an oxide film in between the substrates, the substrates 105 and 106 having a thickness of 140 micrometers and a thickness of 60 micrometers, respectively.

The moving part 96 includes an oscillating plate 100, bracing beams 101, and a movable mirror 102. A planar coil 99 (shown in FIG. 7B) is formed on the oscillating plate 100. The bracing beams 101 are provided to stand from both ends of the oscillating plate 100 in the main-scanning direction X. The movable mirror 102 is layered on the oscillating plate 100, and the reflection surface 95 is formed on the movable mirror 102. The twist beams 97 can be twisted, and the moving part 96, i.e., the reflection surface 95, is rotatable by twisting the twist beams 97. The frame 98 includes a pair of frames 103 and 104, which are layered.

To obtain the mirror unit 91, first of all, the substrate 105 (a second substrate) with the thickness of 140 micrometers is etched from the surface side of the substrate 105 according to a dry process by plasma etching to leave the twist beams 97, the oscillating plate 100 on which the planar coil 99 is formed, the bracing beams 101 that form bones of the moving part 96, and the frame 103, and to pierce through the rest of the portions up to the oxide film. The substrate 106 (a first substrate) with the thickness of 60 micrometers is then etched by anisotropic etching with, for example, potassium hydroxide, from the surface side of the substrate 106 to leave the movable mirror 102 and the frame 104 and to pierce the rest of the portions up to the oxide film. Finally, the oxide film around the moving part 96 is removed, so that the mirror unit 91 is formed.

It is assumed herein that the width of the twist beams 97 and the width of the bracing beams 101 are from 40 micrometers to 60 micrometers. As described above, to gain a large angle of twisting the moving part 96, i.e., the reflection surface 95, it is desirable that the moment of inertia I of the moving part 96 is small. On the other hand, the reflection surface 95 is deformed due to the inertia force, so that the structure of the moving part 96 is designed to be skeletal in the first embodiment.

The reflection surface 95 is formed by depositing an aluminum thin film on the surface of the substrate 106 that includes the surface of the movable mirror 102. The planar coil 99 made from a copper thin film, terminals 107 wired via the twist beams 97, and a patch for trimming are formed on the surface of the substrate 105. Alternatively, it can be configured that the permanent magnets 94 made as a thin film are placed on the side of the oscillating plate 100, and the planar coil 99 is formed on the side of the frame 104.

The mirror unit 91 is mounted onto the mount 92 in a state that the reflection surface 95 is facing to the front. The mirror unit 91 is configured to generate Lorentz force on each of its sides parallel to the twist beams 97 of the planar coil 99 by passing an electric current between the terminals 107, to twist the twist beams 97 and to generate a torque that turns the moving part 96, i.e., the reflection surface 95, and when the electric current is discontinued, the moving part 96 returns to a position flush with the frame 98 due to an elastic restoring force of the twist beams 97. Thus, the movable mirror 102 can be reciprocated and oscillated by alternately switching the direction of the current passing through the planar coil 99.

Additionally, in terms of time, a synchronization detecting sensor 115, arranged at a starting end of a scanning area, detects the light beam 59 reflected for scanning by the reflection surface 95 of the oscillating mirror 85 in accordance with a time difference between a detection signal detected during a second-direction scanning and a detection signal detected during a first-direction scanning, and then the angle of twisting the reflection surface 95 is controlled to be constant. During the time period from the detection of the light beam 59 in the second-direction scanning until the detection of the light beam 59 in the first-direction scanning, it is configured that a light emission of the semiconductor laser 51 as a light emission source is inhibited.

The deflection unit 39 is accommodated in the optical housing 35, and the light beam 59 from the cylindrical lens 38 is guided to the reflection surface 95. The deflection unit 39 deflects the light beam 59 guided onto the reflection surface 95, and then emits the light beam 59 to an fθ lens 116 in the imaging optical system 32. When deflecting the light beam 59, the direction of the light beam 59 is adjusted with an adjusting screw such that the light beam comes into the central area of the reflection surface 95 of the oscillating mirror 85, and then the light beam 59 is deflected by the reflection surface 95, and comes into the fθ lens 116. The deflection unit 39 is accommodated in the optical housing 35 and blocked from outside air, so that the deflection unit 39 is protected from change in oscillation width caused by convection of outside air.

The light source device 31 emits the light beam 59 from the semiconductor laser 51 of the light source unit 48 to the fθ lens 116. The light source device 31 is secured by a pair of the plate members 34 that are parallel to each other, and screws.

As shown in FIGS. 3 and 4, the imaging optical system 32 includes the fθ lens 116 as a scanning lens, and a turn mirror 118. The fθ lens 116 is formed as an elongated member, of which the longitudinal direction is parallel to the longitudinal direction of the photosensitive drum 8. The fθ lens 116 is attached inside the emission window 46 of the optical housing 35, and bonded with an adhesive. The central portion of the fθ lens 116 in the main-scanning direction X is formed into a convex shape projecting in a direction away from the oscillating mirror 85. The fθ lens 116 lets the light beam 59 pass through, and has convergence of the light beam 59 in the sub-scanning direction Z.

The turn mirror 118 is formed into a band plate of which the longitudinal direction is parallel to the longitudinal direction of the photosensitive drum 8. The turn mirror 118 is arranged at an appropriate position to guide the light beam 59 passed through the fθ lens 116 to the outer surface of the photosensitive drum 8.

According to the imaging optical system 32, the light beam 59 comes into the fθ lens 116 from the reflection surface 95 of the oscillating mirror 85 of the light source device 31. The light beam 59 passed through the fθ lens 116 from the light source unit 48 is reflected by the turn mirror 118, forms an image on the photosensitive drum 8 in a spotting manner, and forms an electrostatic latent image based on image information.

As shown in FIG. 4, the laser writing unit 22 includes the synchronization detecting sensor 115 for activating the semiconductor laser 51 of the light source unit 48 in a synchronized manner. The synchronization detecting sensor 115 receives an incidence of the light beam 59 that is deflected by the reflection surface 95 of the oscillating mirror 85, passes by the side of the fθ lens 116 as a scanning lens, and then is converged by an imaging lens 122.

The synchronization detecting sensor 115 detects the light beam 59 in accordance with a time difference between a detection signal detected during the second-direction scanning and a detection signal detected during the first-direction scanning, and then the angle of twisting the reflection surface 95 is controlled to be constant based on the detection signals.

Figure 10A:
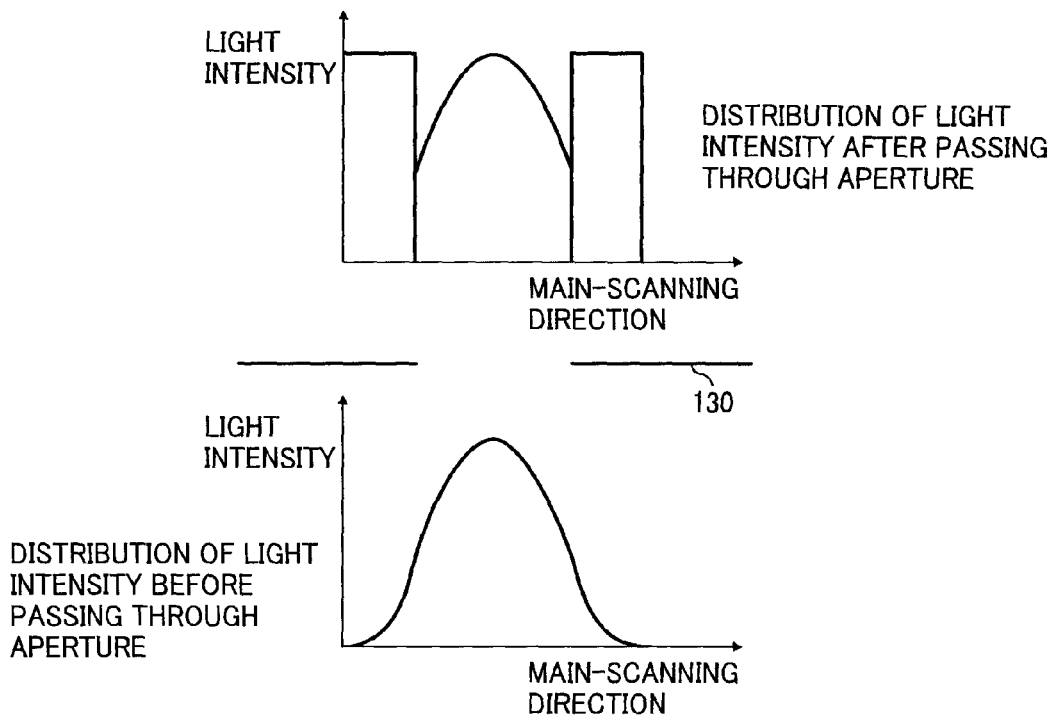
FIG. 10A is a schematic diagram for explaining distributions of light intensities before and after passing through an aperture when the position of the light source unit is deviated in the light source device shown in FIG. 5.
Figure 10B:
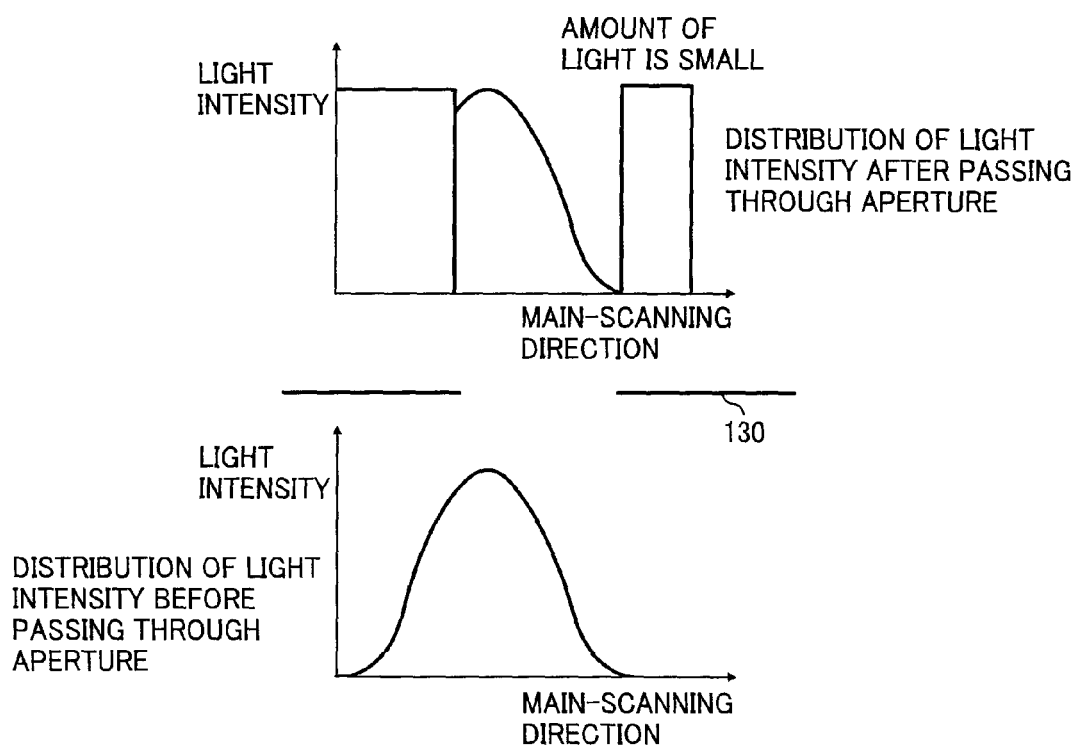
FIG. 10B is a schematic diagram for explaining distributions of light intensities according to a conventional auto power control before and after passing through the aperture when the light source position is deviated.

Moreover, according to the first embodiment, the synchronization detecting sensor 115 detects an amount of light, and then a reference value for a light-amount adjusting unit is set based on the amount of light (signal). Therefore, the synchronization detecting sensor 115 also functions as a light-amount detecting unit. If an amount of light is adjusted according to the conventional auto power control, when the position of the light source unit is deviated due to a mechanical tolerance, the amount of light onto the scanned surface becomes insufficient as shown in FIG. 10B. By contrast, as the synchronization detecting sensor 115 detects an amount of light after passing though the aperture, and the light-source activating unit as the light-amount adjusting unit adjusts the amount of light, the amount of light onto the scanned surface can be kept temporally constant as shown in FIG. 10A. The term of the light-source activating unit means to include a function of a writing control unit.

The auto power control is a method according to which a light receiving element monitors a light output from a semiconductor laser, and a forward current of the semiconductor laser is controlled to a desired value based on a detection signal of a light receiving current proportionate to the light output of the semiconductor laser.

Figure 11A:
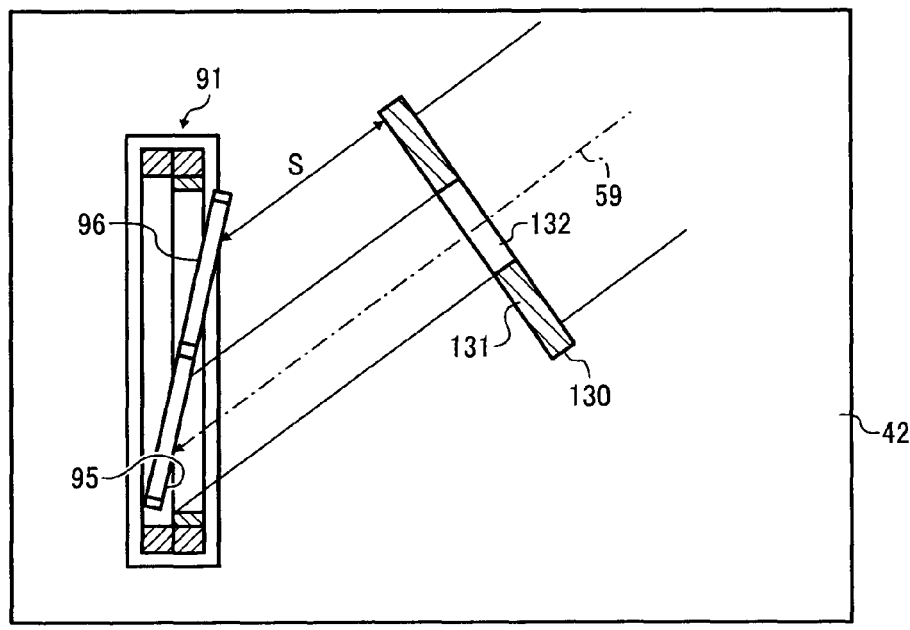
FIGS. 11A and 11B are schematic diagrams for explaining a function of limiting a beam width by changing a positional relation between a reflection surface of the oscillating mirror and the aperture shown in FIG. 4.
Figure 11B:
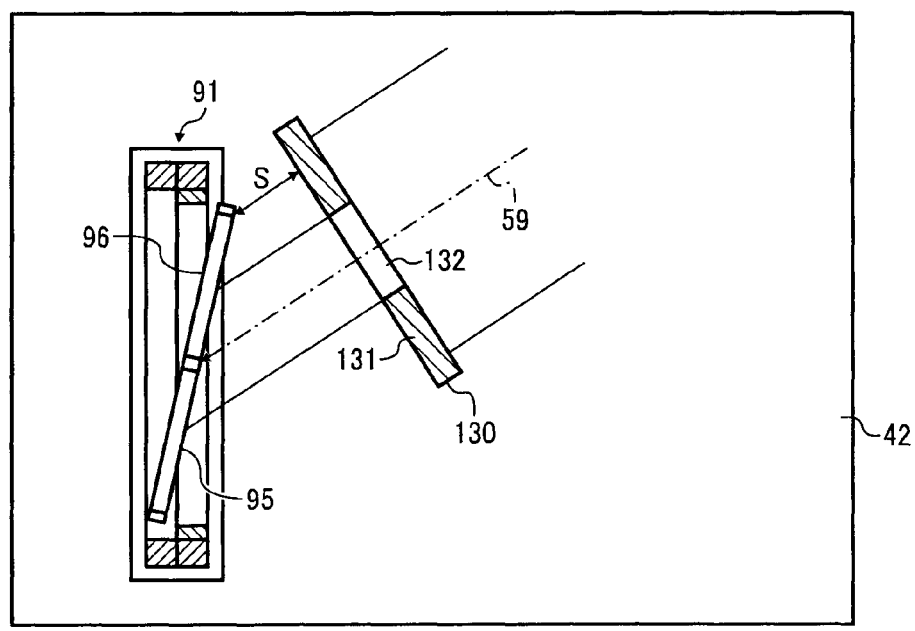

FIGS. 11A and 11B are schematic diagrams for explaining the oscillating mirror 85 as a light deflection unit and relevant units in the laser writing unit 22 as the optical scanning apparatus in the image forming apparatus 1 shown in FIG. 4.

According to the first embodiment, as shown in FIGS. 4 and 5, the aperture 130 is provided between the semiconductor laser 51 of the light source unit 48 and the oscillating mirror 85, and is furthermore, accommodated in the optical housing 35 and arranged between the cylindrical lens 38 and the oscillating mirror 85.

The aperture 130 includes a body 131 formed into a flat plate, and an opening 132 that is formed through the center of the body 131. The opening 132 is formed into a rectangle of which the longitudinal direction is in the main-scanning direction.

When the light beam 59 from the semiconductor laser 51 comes into the reflection surface 95 of the oscillating mirror 85, the aperture 130 limits the beam width of the light beam 59 to a width appropriate to the reflection surface 95 by letting the light beam 59 pass through the opening 132 of the aperture 130.

Thus, the beam width of the light beam 59 is limited by the aperture 130 such that the irradiation position in the main-scanning direction of the light beam 59 reliably comes into the reflection surface 95.

As shown in FIG. 11A, if the distance (an arrow) S between the aperture 130 and the oscillating mirror 85 (strictly, the mirror unit 91) is long, the incidence position of the light beam 59 irradiated onto the reflection surface 95 is deviated to an end, so that a deviation occurs on the irradiation position in the main-scanning direction of the light beam 59 onto the reflection surface 95.

However, as shown in FIG. 11B, by making the distance S between the aperture 130 and the oscillating mirror 85 shorter, the deviation of the incidence position of the light beam 59 is reduced. As a result, the deviation of the irradiation position in the main-scanning direction of the light beam 59 onto the reflection surface 95 can be reduced, so that the light beam 59 can be irradiated to the center of the reflection surface 95 of the oscillating mirror 85.

According to the first embodiment, because the aperture 130 is provided between the light source unit and the oscillating mirror 85, the incidence position in the main-scanning direction of the light beam 59 onto the reflection surface 95 of the oscillating mirror 85 can be adjusted without giving influence on the imaging optical system closer to the scanned surface than the oscillating mirror 85. Accordingly, the light beam 59 can be irradiated onto the center of the reflection surface 95 of the oscillating mirror 85 in the main-scanning direction.

Furthermore, because the aperture 130 is arranged in the vicinity of the oscillating mirror 85 between the semiconductor laser 51 and the oscillating mirror 85, the incidence position in the main-scanning direction of the light beam 59 onto the reflection surface 95 of the oscillating mirror 85 can be easily adjusted, so that the light beam 59 can be reliably irradiated onto the center of the reflection surface 95 of the oscillating mirror 85 in the main-scanning direction.

Thus, the light beam 59 can be reliably deflected at the center of the reflection surface 95.

Moreover, because the aperture 130 is arranged between the cylindrical lens 38 and the oscillating mirror 85, the aperture 130 can be placed closer to the oscillating mirror 85, so that the incidence position in the main-scanning direction of the light beam 59 onto the reflection surface 95 of the oscillating mirror 85 can be adjusted more effectively.

Accordingly, even if a deviation within a mounting tolerance or a process tolerance occurs, the light beam 59 can be reliably irradiated onto the center of the reflection surface 95 of the oscillating mirror 85 in the main-scanning direction. Thus, the light beam 59 can be reliably deflected at the center of the reflection surface 95.

If the reflection surface 95 of the oscillating mirror 85 is waved and deformed, a deformation in the central area of the reflection surface 95 is small, so that a blurring of the light beam 59 at the imaging position can be avoided without thickening the oscillating mirror 85, generation of a scattered light, such as a flare light due to an eclipse of the light beam 59, is suppressed, an image in a high quality without degradation in the image quality, such as a stain on the background, can be created, and image processing at a high speed, in a wide angle, and in a high quality can be achieved by reduction in the moment of inertia due to downsizing of the oscillating mirror diameter.

Because the image forming apparatus 1 includes the laser writing unit 22, the image is not degraded due to an eclipse of the light beam 59, the oscillating mirror 85 can be downsized, so that a high quality of image forming, a small size of apparatus, and a high speed of image forming can be achieved.

Figure 12:
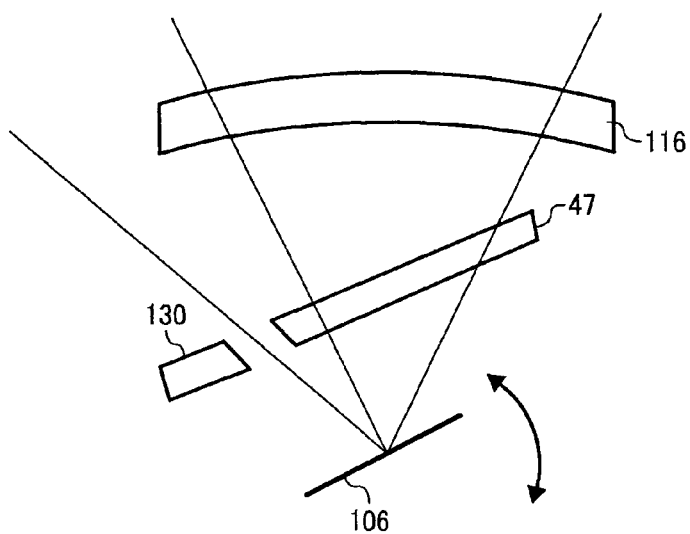
FIG. 12 is a schematic diagram for explaining a deflection unit includes a component that combines a transparent member and an opening.

FIG. 12 is a cross section of the main scanning with light beam passing. As shown in FIG. 12, the aperture 130 can be provided in a part of the transparent member 47. According to such a configuration, the aperture 130 and the transparent member 47 can be combined into one component, so that the number of pieces of parts can be reduced.

A second embodiment of the present invention is explained below with reference to FIGS. 13 to 15.

Figure 13:
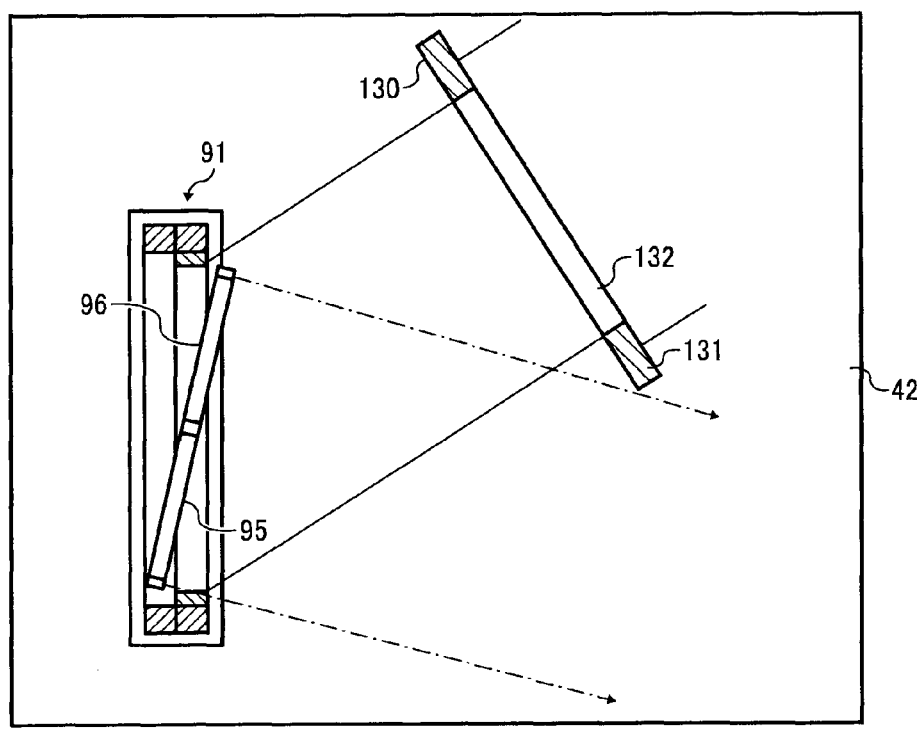
FIG. 13 is a schematic diagram for explaining a relation between the width of a reflection surface of an oscillating mirror and a function of limiting a beam width by an aperture according to a second embodiment of the present invention.

FIG. 13 is a schematic diagram for explaining the oscillating mirror 85 as a light deflection unit and the aperture 130 as an aperture unit of a laser writing unit in an image forming apparatus according to the second embodiment of the present invention. The same components in FIG. 13 as those in the first embodiment are assigned with the same reference numerals, and explanations of them are omitted.

According to the second embodiment, as shown in FIG. 13, the opening 132 of the body 131 of the aperture 130 is formed larger than the reflection surface 95 of the oscillating mirror 85.

By configuring the aperture 130 in this way, the beam width of the light beam 59 can be formed larger than the width of the oscillating mirror 85, and the light beam 59 can be irradiated onto the whole of the reflection surface 95 in the main-scanning direction, so that the light beam 59 can be reliably guided to the center of the reflection surface 95 in the main-scanning direction. Thus, the light beam 59 can be reliably deflected at the center of the light deflection unit.

According to the second embodiment, as shown in FIG. 14A, neither of the edges in the main-scanning direction of the reflection surface 95 of the oscillating mirror 85 are configured to have curvature, and instead, are substantially straight in the sub-scanning direction. According to the second embodiment, because the beam width of the light beam 59 is larger than the width of the oscillating mirror 85, a shape of the light beam 59 to be narrowed is determined in accordance with the shape of the oscillating mirror 85.

In other words, the beam width of the light beam 59 in the main-scanning direction is limited by the reflection surface 95.

In this way, the shape of the light beam 59 after deflection is formed into a rectangle, and degradation of wavefront aberration, when imaging on the scanned surface, is reduced not to degrade the beam spot diameter.

When it is advantageous in terms of processing to have a curvature on the edges of both ends of the moving part 96 of the oscillating mirror 85 in the main-scanning direction, the reflection surface 95 without curvature on the edges of its both ends in the main-scanning direction can be provided on the moving part 96, as shown in FIG. 14B. In other words, the width of the reflection surface 95 in the main-scanning direction can be formed smaller than the width of the light deflection unit (strictly, the moving part 96) in the main-scanning direction.

According to the second embodiment, because a beam width to be narrowed is determined in accordance with the diameter on the reflection surface 95 in the main-scanning direction, the beam width to be narrowed is changed in accordance with an image height to be scanned, as shown in FIGS. 15A and 15B. As shown in FIG. 15A, suppose a is the beam width of an incident beam narrowed at the reflection surface 95 when scanning an image height close to the light source (hereinafter, "plus image height"), while b is the beam width of the incident beam narrowed at the reflection surface 95 when scanning an image height far from the light source (hereinafter, "minus image height") as shown in FIG. 15B, a is larger than b.

In other words, the amount of light on the scanned surface when scanning the plus image height is more than that when scanning the minus image height, and the change in the amount of light is monotone decreasing.

Figure 16:
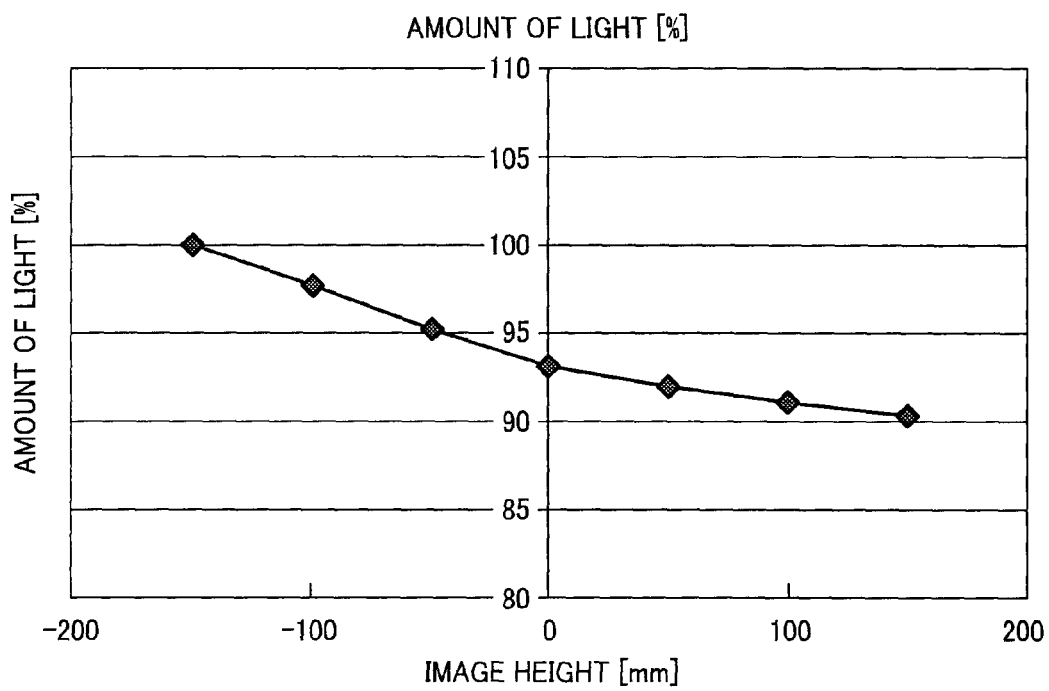
FIG. 16 is a graph that represents a shading property of a transparent member according to the second embodiment.
Figure 17:
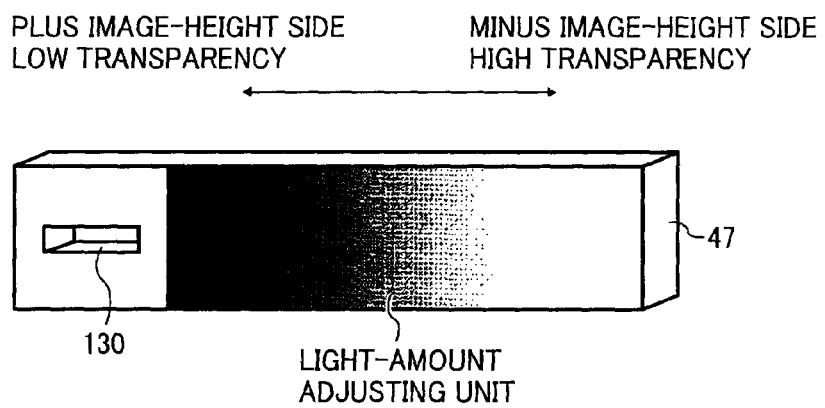
FIG. 17 is a schematic diagram for explaining the shading property of the transparent member according to the second embodiment.

For this reason, according to the second embodiment, the transparent member 47 is provided with a shading property as shown in FIGS. 16 and 17. A graph is shown in FIG. 16, in which the amount of light for scanning an image height of 150 millimeters at the highest transparency is presented as the reference for amounts of light for all image heights.

The shading property is set to prevent the irregularity of the amount of light on the scanned surface by arranging the amount of light for the plus image height less than the amount of light of the minus image height to cancel the irregularity of the amount of light on the scanned surface among image heights.

In other words, as shown in FIG. 17, the material of the transparent member 47 is adjusted such that the transparency on the plus image height side (incidence side) is low, and the transparency on the minus image height side (opposite side to the incidence) is high. Accordingly, the transparent member 47 is to be a light-amount adjusting unit that adjusts along the main-scanning direction the amount of light of a light beam deflected by the light deflection unit.

Figure 18A:
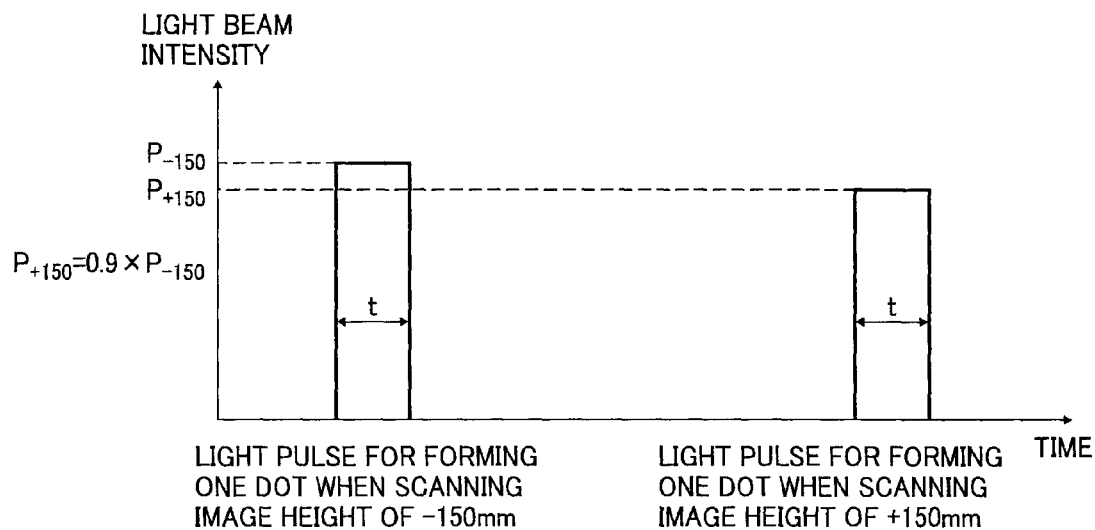
FIGS. 18A and 18B are schematic diagrams for explaining adjustment of the amount of light according to a third embodiment of the present invention.
Figure 18B:
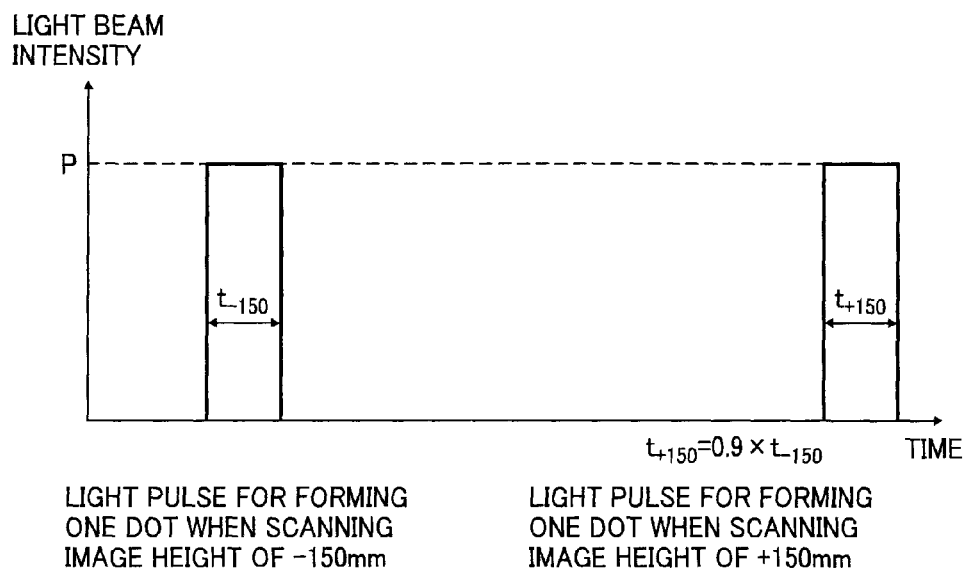

Alternatively, according to a third embodiment of the present invention, irregularity of the amount of light can be suppressed by adjusting, along the main-scanning direction, an integral amount of light per dot, as shown in FIGS. 18A and 18B. FIG. 18A is a graph of the intensity of a light beam for an image height on the opposite side to the incidence (minus image height) is set higher than the intensity of a light beam for an image height on the incidence side (plus image height). The relation between image heights and respective intensities of the light beam is similar to the shading property shown in FIG. 16. The light pulse width for forming a dot is equally set across all of the image heights. The responsible unit that adjusts the integral amount of light per dot is the light-source activating unit.

FIG. 18B is a graph of the light pulse width for forming a dot of an image height on the opposite side to the incidence (minus image height) is set larger than the light pulse width for forming a dot of an image height on the incidence side (plus image height). The relation between image heights and respective light pulse widths is similar to the shading property shown in FIG. 16. The light beam intensity is equally set across all of the image heights.

In this way, irregularity of the amount of light can be suppressed by adjusting the integral amount of light per dot in accordance with an image height.

A fourth embodiment of the present invention is explained below with reference to FIG. 19.

According to the optical scanning apparatus of the image forming apparatus 1 in the embodiments described above, the outer surface of one unit of the photosensitive drums 8 is scanned by the oscillating mirror 85 with the light beam 59 from one unit of the light source unit 48.

Figure 19:
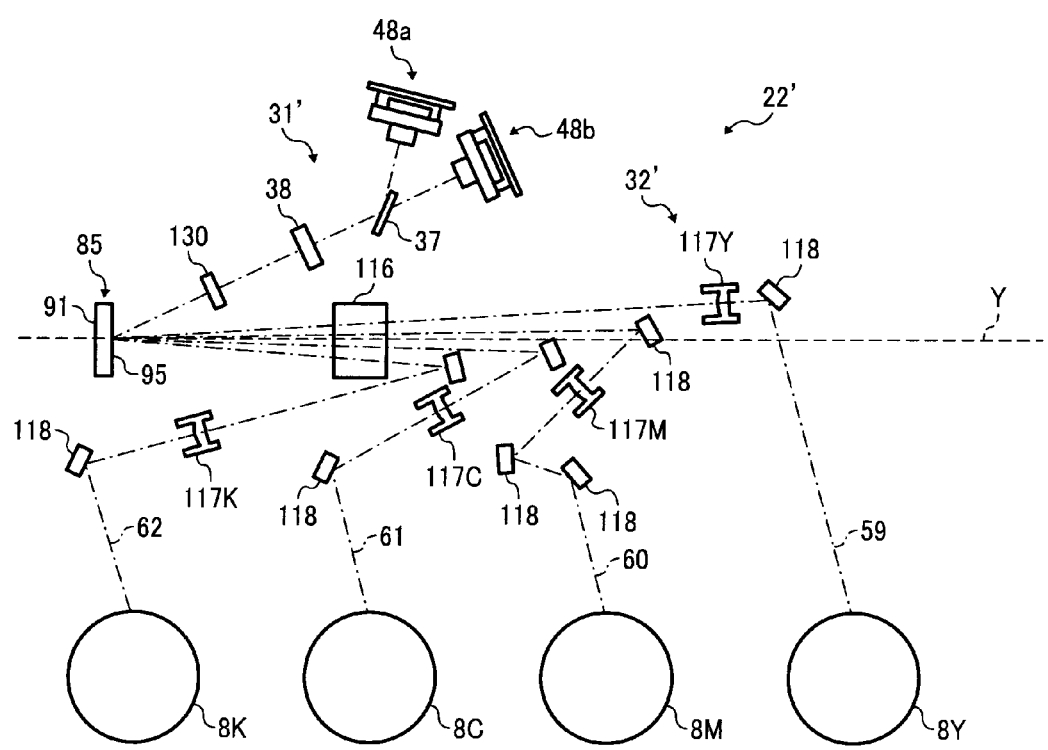
FIG. 19 is a schematic diagram for explaining an optical scanning apparatus according to a fourth embodiment of the present invention.
Figure 20:
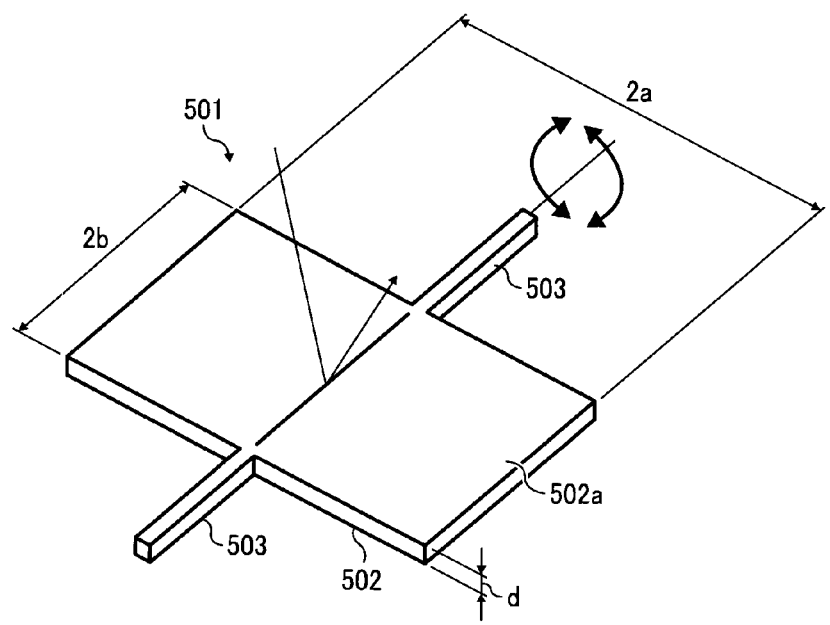
FIG. 20 is a schematic diagram for explaining a moving part of a conventional oscillating mirror.
Figure 21:
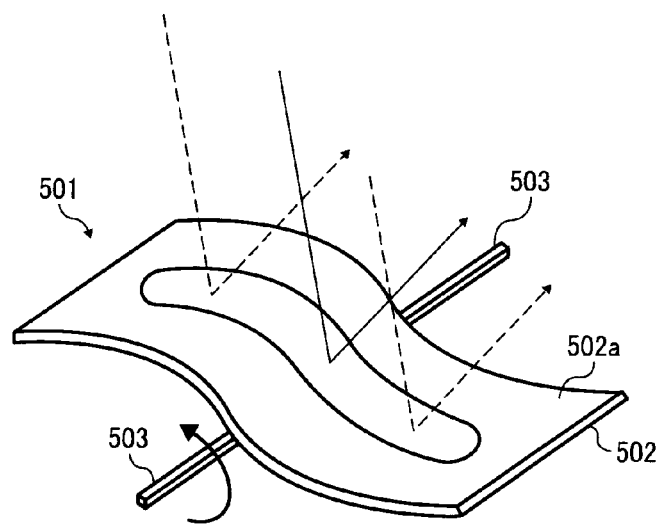
FIG. 21 is a schematic diagram for explaining a state that the moving part of the oscillating mirror shown in FIG. 19 is waved.
Figure 22A:
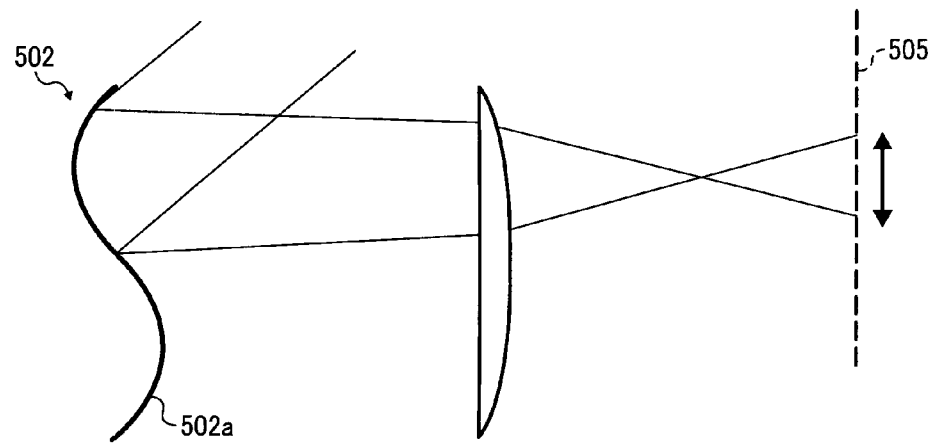
FIG. 22A is a schematic diagram for explaining an example of a deflection of a light beam incident to a concave end of the moving part in the waved state shown in FIG. 21.
Figure 22B:
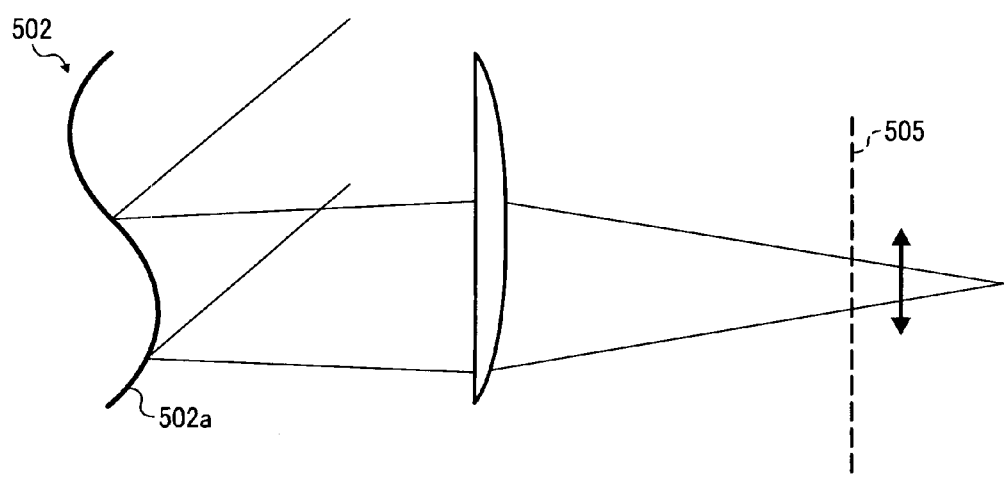
FIG. 22B is a schematic diagram for explaining an example of a deflection of a light beam incident to a convex end of the moving part in the waved state shown in FIG. 21.

However, the optical scanning apparatus according to the fourth embodiment of the present invention can be applied to a multicolor image forming apparatus for more than one color, or a full-color image forming apparatus, as shown in FIG. 19. FIG. 19 is a schematic diagram for explaining a modification of the laser writing unit 22 shown in FIG. 2.

The same components in FIG. 19 as those in the first embodiment are assigned with the same reference numerals, and explanations of them are omitted.

According to an example shown in FIG. 19, four light beams 59, 60, 61, and 62 from a plurality of light source units 48a and 48b of a laser writing unit 22' as an optical scanning apparatus of an image forming apparatus are guided to a plurality of photosensitive drums 8Y, 8M, 8C, and 8K.

The laser writing unit 22' includes a light source device 31' and an imaging optical system 32'. The light source device 31' includes the optical housing 35, the light source units 48a and 48b, an incident mirror 37, the cylindrical lens 38 as an image forming lens, and the deflection unit 39.

Each of the light source units 48a and 48b includes a pair of semiconductor lasers (not shown), and the semiconductor lasers emit the light beams 59, 60, 61, and 62 corresponding to the photosensitive drums 8Y, 8M, 8C, and 8K, respectively.

Each two of the semiconductor lasers are arranged in each of the light source units 48a and 48b such that the light beams 59, 60, 61, and 62 make an angle of 2.5 degrees, and cross each other on the reflection surface 95 of the oscillating mirror 85.

The incident mirror 37 is accommodated in the optical housing 35, receives incidences of the light beams 59, 60, 61, and 62 from the respective semiconductor lasers (not shown) in the light source units 48a and 48b, and emits the light beams 59, 60, 61, and 62.

The incident mirror 37 emits the light beams 59, 60, 61, and 62 in a state where the light beams 59, 60, 61, and 62 from the semiconductor lasers are vertically aligned in a line (aligned along the sub-scanning direction Z), maintaining intervals in the sub-scanning direction Z between them.

The imaging optical system 32' includes the fθ lens 116, a plurality of toroidal lenses 117Y, 117M, 117C, and 117K, and the turn mirrors 118. The fθ lens 116 is arranged such that the longitudinal direction of the fθ lens 116 is in parallel with the longitudinal direction of the photosensitive drums 8Y, 8M, 8C, and 8K.

The toroidal lenses 117Y, 117M, 117C, and 117K are provided correspondingly to the photosensitive drums 8Y, 8M, 8C, and 8K, respectively, and each formed into a stick shape of which longitudinal direction is in parallel with the longitudinal direction of the photosensitive drums 8Y, 8M, 8C, and 8K. Each of the toroidal lenses 117Y, 117M, 117C, and 117K lets pass only one corresponding beam of the light beams 59, 60, 61, and 62 each of which scans the outer surface of one corresponding drum of the photosensitive drums 8Y, 8M, 8C, and 8K.

The turn mirrors 118 are each formed into a band plate of which longitudinal direction is in parallel with the longitudinal direction of the photosensitive drums 8Y, 8M, 8C, and 8K, and arranged at respective appropriate positions to guide the light beams 59, 60, 61, and 62 passed through the fθ lens 116 to the outer surfaces of the photosensitive drums 8Y, 8M, 8C, and 8K via the toroidal lenses 117Y, 117M, 117C, and 117K, respectively.

According to the laser writing unit 22' configured as described above, the incident mirror 37 emits the light beams 59, 60, 61, and 62 from the light source units 48a and 48b of the light source device 31' in a state that the light beams 59, 60, 61, and 62 are aligned along the sub-scanning direction Z and maintaining intervals between them. The light beams 59, 60, 61, and 62 are passed through the cylindrical lens 38 and emitted into parallel rays. The aperture 130 limits respective beam widths of the light beams 59, 60, 61, and 62, and leads the light beams 59, 60, 61, and 62 from the light source units 48a and 48b to grazing incidence onto the oscillating mirror 85 at different angles in the sub-scanning direction Z. Accordingly, the light beams 59, 60, 61, and 62 from the light source units 48a and 48b are collectively deflected and reflected, so that the fθ lens 116 as a scan lens receives incidences of the light beams 59, 60, 61, and 62 deflected and reflected by the reflection surface 95.

The light beams 59, 60, 61, and 62 passed through the fθ lens 116 are separated into individual colors by the toroidal lenses 117Y, 117M, 117C, and 117K, and reflected by respective mirrors of the turn mirrors 118 corresponding to the photosensitive drums 8Y, 8M, 8C, and 8K, and form an image into a spot and create an electrostatic latent image based on image information onto the photosensitive drums 8Y, 8M, 8C, and 8K, respectively.

According to the embodiments described above, the optical scanning apparatus includes the oscillating mirror 85 as a light deflection unit. However, according to the present invention, a polygon mirror that is generally used in a conventional optical scanning apparatus can be used, so that the light deflection unit according to the present invention is not limited to an oscillating mirror.

The embodiments described above only describe typical forms according to the present invention, and the present invention is not limited to the above embodiments. In other words, the embodiments can be implemented in various modifications within a scope not departing from the gist of the present invention.

According to the embodiments of the present invention, change of the incidence position of the light beam onto the oscillating mirror due to a deviation within a mounting tolerance and an assembling tolerance can be suppressed. Moreover, the aperture unit can be arranged closer to the reflection surface, and the light beam can be guided to the vicinity of the center of the oscillating mirror more efficiently. As a result, the optical scanning apparatus can reduce degradation of the beam spot diameter of the light beam in the main-scanning direction and image surface curvature, which are caused by a deviation of local light-convergence power due to dynamic surface deformation of the oscillating mirror, so that the beam spot diameter in the main-scanning direction can be kept uniform in size across the scanned surface.

Furthermore, the light beam can be irradiated all over the oscillating mirror, so that such irradiation has the same effect as the light beam is irradiated to the vicinity of the center of the oscillating mirror without arranging the aperture unit.

Moreover, when the optical scanning apparatus is configured to irradiate the light beam all over the oscillating mirror, degradation of wavefront aberration of the deflected light beam can be reduced, so that degradation of the beam spot diameter on the scanned surface can be suppressed.

Furthermore, when it is difficult in terms of processing to eliminate a curvature on the edges of both ends of the reflection surface in the main-scanning direction, degradation of wavefront aberration of the deflected light beam can be reduced, so that degradation of the beam spot diameter on the scanned surface can be suppressed.

Moreover, the number of items of parts can be reduced by using the transparent member for common use as the aperture unit, so that the optical scanning apparatus can be provided at a low cost.

Furthermore, irregularity of the amount of light among image heights can be reduced on the scanned surface, so that an image in a high quality that irregularity in density is suppressed can be formed.

Moreover, because the amount of light after deflection and reflection is detected, and the reference value for the light-amount adjusting unit is set based on the signal of the detected amount of light, when the position of the light source changes due to a deviation within a tolerance, the scanned surface can be exposed with an reliable amount of light, so that image forming in a high quality without irregularity in density and with no stain on the background can be achieved.

Furthermore, as the beam spot diameter and the amount of light are uniformly kept across the whole scanned surface by adjusting the incidence position of the light beam onto the light reflection surface, the image forming apparatus that can form an image in a good quality can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus comprising:
    a light source unit that emits a light beam;
    a light-source activating unit that activates the light source unit;
    an aperture unit including an opening to limit a beam width of the light beam output from the light source unit;
    a light deflection unit that includes a reflection surface configured to deflect the light beam output from the light source unit, the reflection surface being configured to rotate; and
    an optical system that forms an image on a spot on a scan target surface with the light beam deflected by the light deflection unit,
    wherein the aperture unit is arranged such that a center of the light beam incident to the light deflection unit in a main-scanning direction, which corresponds to a longitudinal direction of the scan target surface, substantially aligns with a rotation axis of the reflection surface on the reflection surface.

2. The optical scanning apparatus according to claim 1, further comprising a linear-image forming lens that forms a linear image by converging the light beam output from the light source unit only into one direction, wherein the aperture unit is arranged between the linear-image forming lens and the light deflection unit.

3. The optical scanning apparatus according to claim 1, further comprising a transparent member through which the light beam deflected by the light deflection unit passes, wherein the transparent member is connected to the aperture unit including the opening to limit the beam width of the light beam output from the light source unit.

4. The optical scanning apparatus according to claim 1, further comprising a light-amount adjusting unit that adjusts an amount of light of the light beam deflected by the light deflection unit along the main-scanning direction.

5. The optical scanning apparatus according to claim 4, wherein the light-amount adjusting unit increases an amount of passing-through light of the light beam from an incidence side of the light beam to a side opposite to the incidence side with respect to a light axis of at least one scan lens of the optical system in the main-scanning direction.

6. The optical scanning apparatus according to claim 3, wherein a light-amount adjusting unit is provided in the transparent member.

7. The optical scanning apparatus according to claim 4, wherein the light-amount adjusting unit is provided in a transparent member.

8. The optical scanning apparatus according to claim 7, wherein the light-source activating unit adjusts a pulse width along the main-scanning direction to increase an amount of light of the light beam from an incidence side of the light transparent member to a side opposite to the incidence side.

9. The optical scanning apparatus according to claim 7, wherein the light-source activating unit adjusts a light beam intensity along the main-scanning direction to increase an amount of light of the light beam from an incidence side of the transparent member to a side opposite to the incidence side.

10. The optical scanning apparatus according to claim 1, further comprising:
    a light-amount detecting unit that detects an amount of light of the light beam deflected by the light deflection unit; and
    a light-amount adjusting unit that adjusts an amount of light of the light source unit, wherein a reference value for the light-amount adjusting unit is set based on a signal obtained by the light-amount detecting unit.

11. An image forming apparatus comprising an image carrier, a charging device, a developing device, and the optical scanning apparatus according to claim 1 as an optical scanning device.

12. An optical scanning apparatus comprising:
    a light source unit that emits a light beam;
    a light deflection unit that includes a reflection surface configured to deflect the light beam output from the light source unit, the reflection surface being configured to rotate; and
    an optical system that forms an image on a spot on a scan target surface with the light beam deflected by the light deflection unit,
    wherein a beam width of the light beam is limited by the reflection surface at least in a main-scanning direction, which corresponds to a longitudinal direction of the scan target surface, such that a center of the light beam substantially aligns with a rotation axis of the reflection surface on the reflection surface.

13. The optical scanning apparatus according to claim 12, wherein edges of the reflection surface in the main-scanning direction are substantially straight in a sub-scanning direction.

14. The optical scanning apparatus according to claim 12, wherein at least a width of the reflection surface in the main-scanning direction is smaller than a width of the light deflection unit in the main-scanning direction.

15. The optical scanning apparatus according to claim 12, further comprising a transparent member through which the light beam deflected by the light deflection unit passes,
   wherein the transparent member includes an aperture unit including an opening to limit a beam width of the light beam output from the light source unit.

16. The optical scanning apparatus according to claim 12, further comprising a light-amount adjusting unit that adjusts an amount of light of the light beam deflected by the light deflection unit along the main-scanning direction.

17. The optical scanning apparatus according to claim 16, wherein the light-amount adjusting unit increases an amount of passing-through light from an incidence side of the light beam to a side opposite to the incidence side with respect to a light axis of at least one scan lens of the optical system in the main-scanning direction.

18. The optical scanning apparatus according to claim 15, wherein a light-amount adjusting unit is provided in the transparent member.

19. The optical scanning apparatus according to claim 16, wherein the light-amount adjusting unit is provided in a transparent member.

20. An image forming apparatus comprising:
   an image carrier,
   a charging device,
   a developing device, and
   the optical scanning apparatus according to claim 12 as an optical scanning device.

* * * * *